(12) United States Patent
Hayase

(10) Patent No.: US 7,986,448 B2
(45) Date of Patent: Jul. 26, 2011

(54) IMAGE PROCESSING APPARATUS AND IMAGE PROCESSING METHOD FOR THE SAME

(75) Inventor: Yosuke Hayase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 11/924,872

(22) Filed: Oct. 26, 2007

(65) Prior Publication Data

US 2008/0100887 A1 May 1, 2008

(30) Foreign Application Priority Data

Oct. 31, 2006 (JP) ................................. 2006-296940

(51) Int. Cl.
*G03F 3/08* (2006.01)
*G06K 9/00* (2006.01)

(52) U.S. Cl. ......... 358/520; 358/523; 358/529; 382/167
(58) Field of Classification Search .................. 358/523, 358/520, 518, 521, 524, 529, 530, 3.23, 1.9; 382/167, 162
See application file for complete search history.

(56) References Cited

U.S. PATENT DOCUMENTS

| | | | |
|---|---|---|---|
| 5,416,890 A * | 5/1995 | Beretta | 345/590 |
| 6,761,426 B2 * | 7/2004 | Tsuchiya et al. | 347/19 |
| 7,206,100 B2 | 4/2007 | Namikata | |
| 2003/0001918 A1 * | 1/2003 | Tsuchiya et al. | 347/19 |
| 2006/0170939 A1 * | 8/2006 | Misumi | 358/1.9 |
| 2007/0091213 A1 * | 4/2007 | Jaspers | 348/687 |
| 2009/0231645 A1 * | 9/2009 | Hayashi | 358/520 |

FOREIGN PATENT DOCUMENTS

JP 2003-125223 A 4/2003

* cited by examiner

*Primary Examiner* — Madeleine A Nguyen
(74) *Attorney, Agent, or Firm* — Canon U.S.A. Inc., I.P. Division

(57) ABSTRACT

An image processing method includes creating a conversion table for converting a color in a device-independent color space into a color in a device color space based on a colorimetry result of a color patch output by a device. Creating the conversion table includes converting a color in a three-dimensional color space dependent on a device into a color in a four-dimensional device color space including black. Converting a color in the three-dimensional color space includes separating an input color in the three-dimensional device-dependent color space into color components of the four-dimensional device color space based on a gradation from the input color to black, using a black generation curve of a gray line set by a user and black generation curves set for individual primary colors of RGBCMY, and performing saturation-increase conversion on the color components in accordance with an amount of a black colorant.

10 Claims, 36 Drawing Sheets

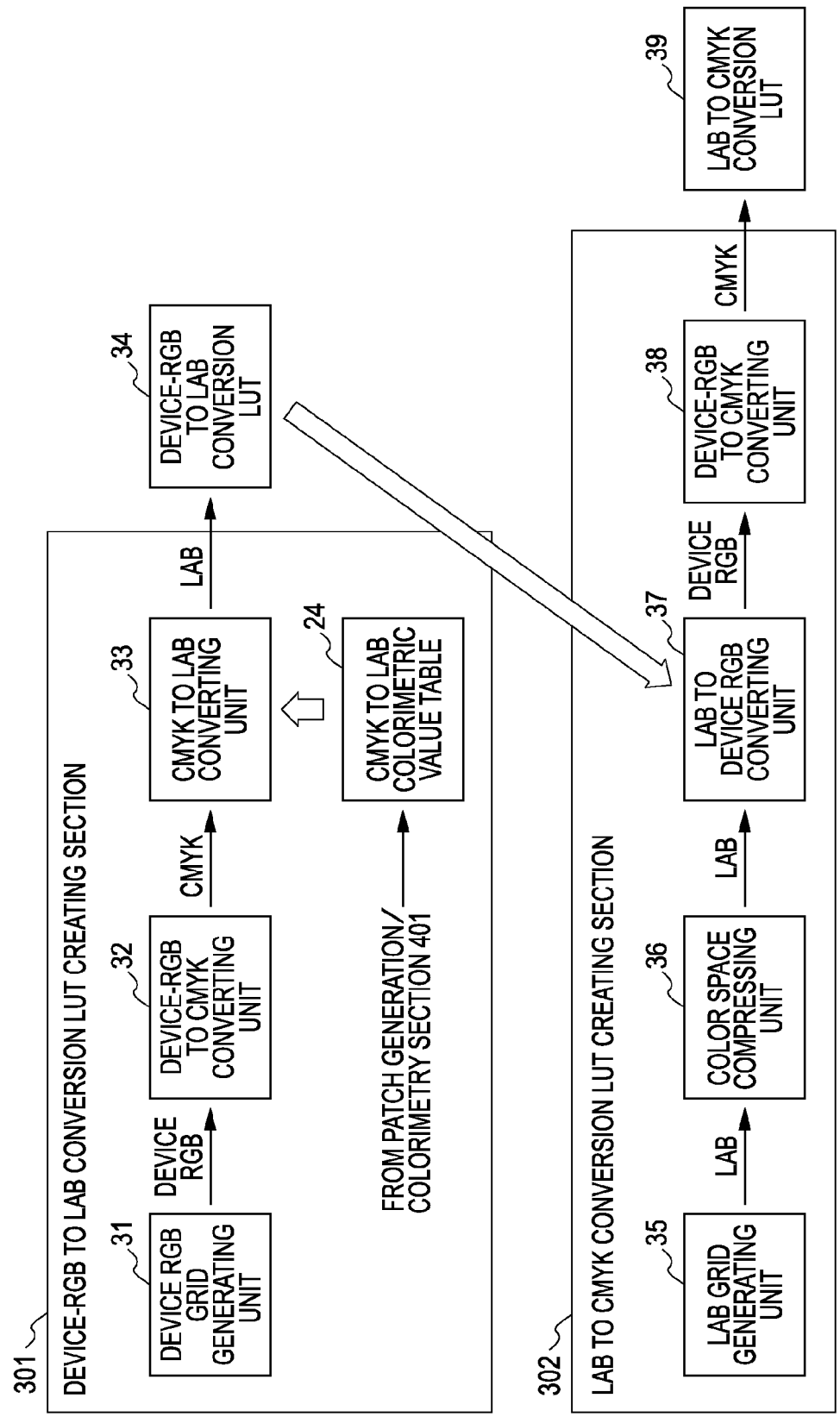

FIG. 7

| RAM | 204 |
|---|---|
| INPUT RGB VALUES | 204c |
| CONVERTED CMY VALUES | 204d |
| OUTPUT CMYK VALUES | 204e |
| CMY COLOR SOLID PARAMETERS | 204k |
| GRADATION CURVE TABLE | 204m |
| DEVICE PARAMETERS | 204g |
|   COLORANT AMOUNT PARAMETER | |
|   BLACK GENERATION CURVE PARAMETER | |
|   NUMBER OF GRID POINTS | |
|   ... | |
| GRADATION COLOR SEPARATION PARAMETERS | 204f |
|   SUM OF CMYK (SumP) | |
|   COLORANT AMOUNT THRESHOLD | |
|   GRAY LINE | |
|   SIX-PRIMARY COLOR CURVE | |
|   USER-INPUT BLACK GENERATION CURVE | |
|   AUTOMATIC BLACK GENERATION CURVE | 204h |
| SATURATION-INCREASE CONVERSION PARAMETER (Cup) | 204i |
|   SPREAD PARAMETER (SP) | |
|   EMPHASIS PARAMETER (em) | |
|   GRAY BALANCE CORRECTION PARAMETER (gc1) | |
|   GRAY BALANCE CORRECTION PARAMETER (gc2) | |
|   COLORANT AMOUNT PARAMETER (tac) | |
| PROGRAM LOAD AREA | |

| EXTERNAL STORAGE UNIT | 205 |
|---|---|
| BLACK GENERATION CURVE DATA | 205e |
| INPUT GRADATION CURVE TABLE | 205x |
| GRADATION CURVE TABLE AFTER COLOR SEPARATION | 205y |
| GRADATION CURVE TABLE AFTER SATURATION-INCREASE CONVERSION | 205z |
| ... | |
| DEVICE-RGB TO CMYK CONVERSION MODULE | 205u |
|   CMY COLOR SOLID GENERATION MODULE | 2051 |
|   GRADATION CURVE TABLE GENERATION MODULE | 2052 |
|   RGB TO CMY CONVERSION MODULE | 2053 |
|   COLOR SEPARATION MODULE | 2054 |
|     CMYK COLORANT AMOUNT CALCULATION MODULE | |
|     BLACK GENERATION CURVE CORRECTION MODULE | |
|     OUTPUT-K CALCULATION MODULE | |
|     CMY EXTRACTION MODULE | |
|   SATURATION-INCREASE CONVERSION MODULE | 2055 |
|     SPREAD PARAMETER CALCULATION MODULE | |
|     EMPHASIS PARAMETER CALCULATION MODULE | |
|     GRAY LINE PARAMETER CALCULATION MODULE | |
|     POINT BLACK PARAMETER CALCULATING MODULE | |
|     COLORANT AMOUNT PARAMETER CALCULATING MODULE | |
|     CMY VALUE CORRECTION MODULE | |
| OTHER MODULES | |
| USER INTERFACE PROGRAM | 205k |

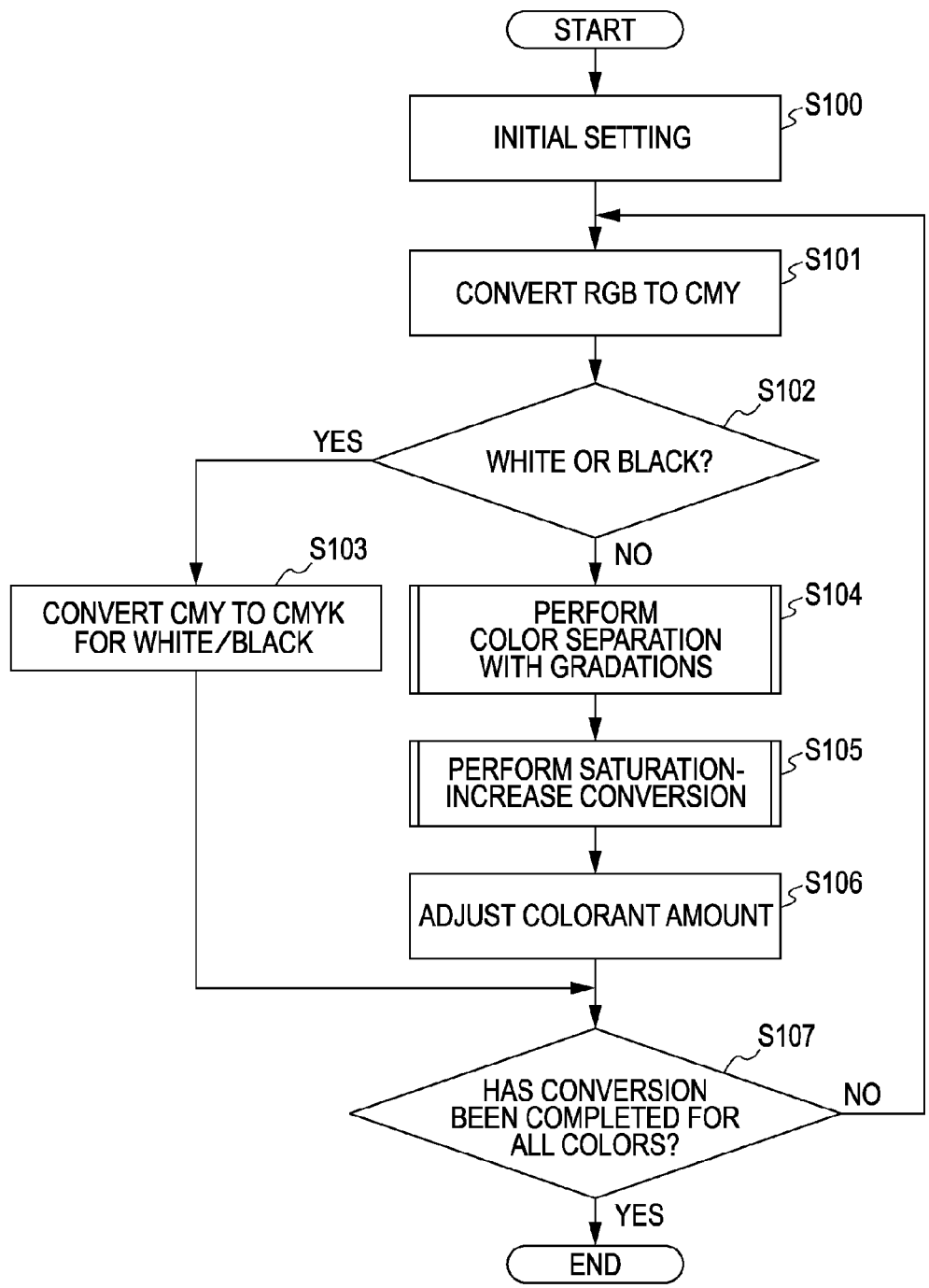

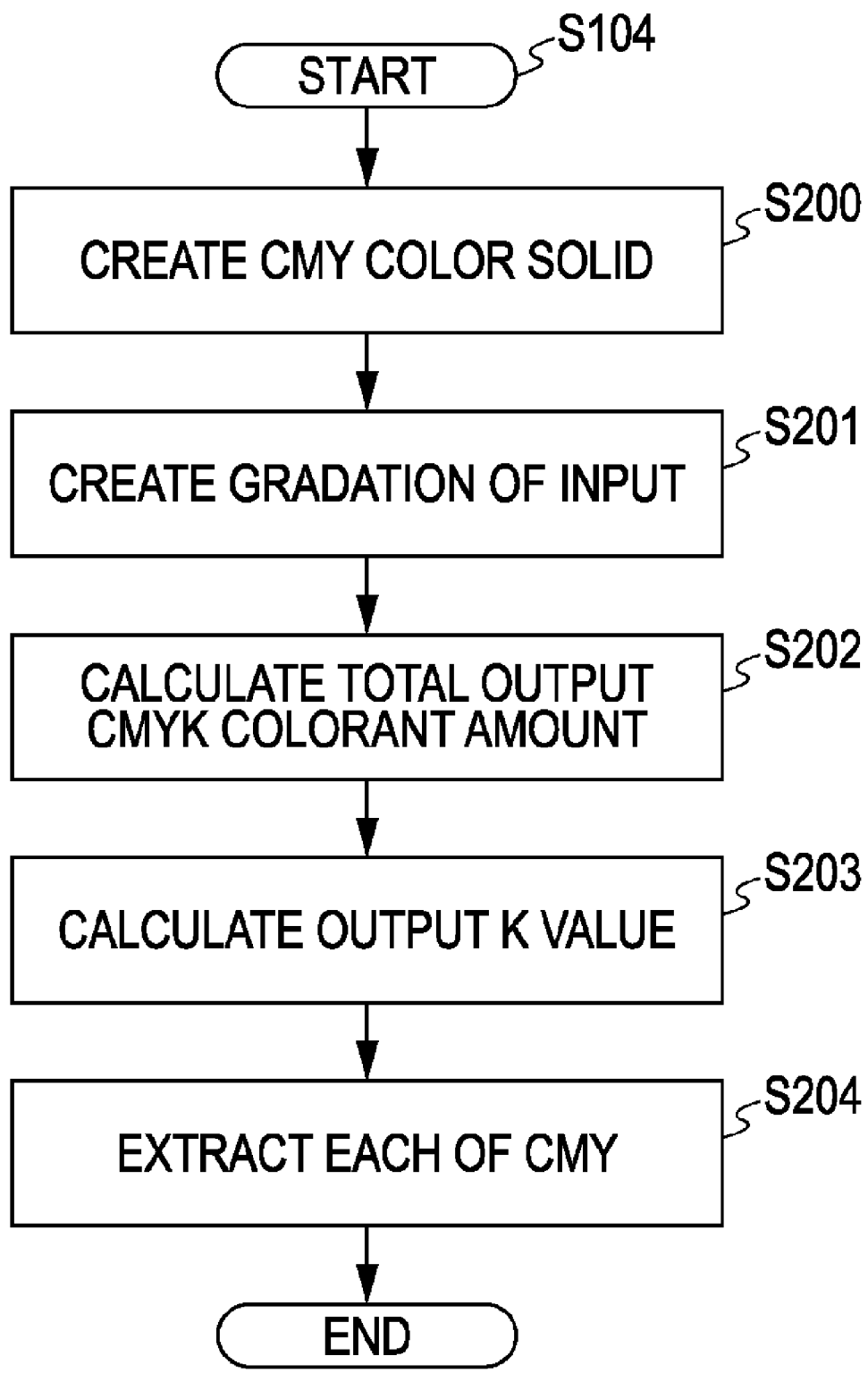

FIG. 36
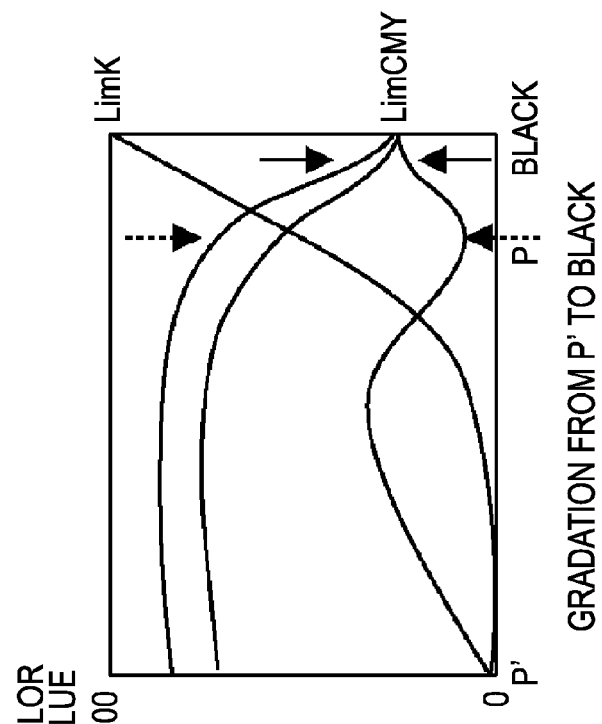
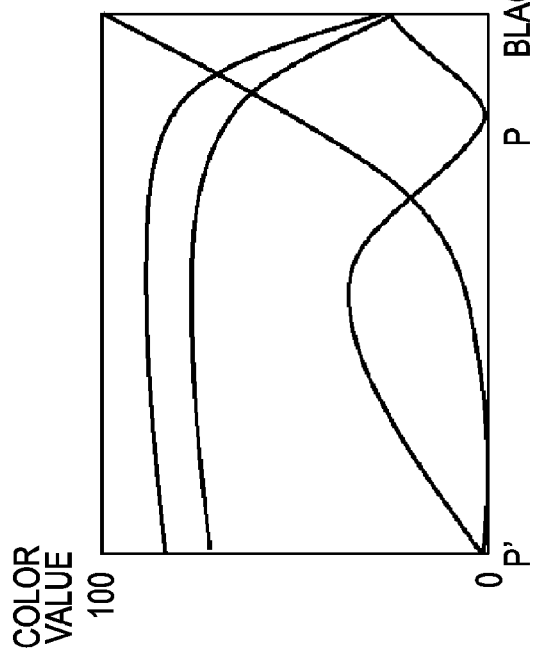

IMAGE PROCESSING APPARATUS AND IMAGE PROCESSING METHOD FOR THE SAME

BACKGROUND OF THE INVENTION

1. Field of the Invention

The present invention relates to image processing apparatuses and information processing methods. In particular, the present invention relates to image processing in which a conversion table is created for converting a color independent of a device to a color in a device color space on the basis of a colorimetry result of a color patch output by an output device.

2. Description of the Related Art

Color conversion techniques which use profiles describing color characteristics of input/output devices in tables have been used for improving color reproduction processing of printers. In such techniques, conversion tables for converting color data from input device color spaces into device-independent color spaces and also converting color data from device-independent color spaces into output device color spaces (i.e., look-up tables (LUTs)) are used for realizing color reproduction between input and output through LUT operations. Thus, the color reproduction performance of printers largely depends on the accuracy of such conversion tables. In particular, precision in creating LUTs for conversion from device-independent color spaces into printer-device color spaces is important for accurate color reproduction.

To create conversion tables, data representing a correspondence relationship between CMYK signals in printers and device-independent signals (i.e., calorimetric tables) is necessary. In general, such data can be obtained by measuring a plurality of color patches output from a printer.

However, since CMYK color spaces used in color printers may depend on the characteristics of the printers, it is difficult to flexibly apply processes for creating conversion tables using only calorimetric tables to various devices. In particular, such processes are difficult to apply to conversion tables for conversion from device-independent color spaces to printer color spaces, since they are strongly affected by nonlinear output characteristics of color printers. To address this, techniques have been developed for increasing color reproduction accuracy by using parameters in addition to calorimetric data, such as density characteristics representing output characteristics of color printers.

For example, Japanese Patent Laid-Open No. 2003-125223 discloses a technique for overcoming nonlinear characteristics of a printer by performing gradation correction processing using linear density of the printer.

SUMMARY OF THE INVENTION

For a color in a CMYK color space, a printer can use a maximum of 400% of the amount of CMYK colorants (100 percent of each colorant). However, it is not likely that an image is printed with 400% of the amount of CMYK colorants. In general, printing is performed with a colorant amount within a predetermined limit (colorant amount limit). For example, an electrophotographic printer generally uses about 200% of colorants. In this case, the color reproduction range (color gamut) of the printer is significantly decreased as compared with a case where 400% of the colorants are used.

FIG. 41 is a diagram for comparison of printer color reproduction ranges between colorant amount limits of 400% and 211%, in an L-b plane in a Lab space. When the amount of available colorant is small (i.e., the amount of colorant is strictly limited), the color reproduction range in a shadow portion in an image is narrow, indicating that gradation reproducibility in the shadow portion is low.

In printing, it is not desirable that a human skin color contains a large amount of a black component, since that causes graininess and roughness of an image. Thus, it is necessary to reduce the amount of a black colorant for a skin color. However, using only a single predetermined black generation curve in color conversion may not satisfy such a need.

The present invention has been made in view of the above circumstances. Accordingly, there is a need for a technique in which different black generation processes are performed for individual hues, so that differences in characteristics between printers are compensated for, and an accurate conversion table is created on the basis of calorimetric data. In addition, there is also a need for a color conversion technique for maintaining a color reproduction range as much as possible and preventing deterioration of gradation reproducibility in an image even when the amount of available colorants is strictly limited.

Accordingly, an image processing method according to an exemplary embodiment of the present invention includes creating a conversion table for converting a color in a device-independent color space into a color in a device color space based on a colorimetry result of a color patch output by a device. Creating the conversion table includes converting a color in a three-dimensional color space dependent on a device into a color in a four-dimensional device color space including black. Converting the color in the three-dimensional color space includes separating an input color in the three-dimensional device-dependent color space into color components of the four-dimensional device color space based on a gradation from the input color to black, using a black generation curve of a gray line which is set by a user and black generation curves set for individual primary colors of RGB-CMY (red, green, blue, cyan, magenta and yellow), and performing saturation-increase conversion on the color components in accordance with an amount of a black colorant.

Further features of the present invention will become apparent from the following description of exemplary embodiments with reference to the attached drawings.

BRIEF DESCRIPTION OF THE DRAWINGS

FIG. 6 illustrates a processing procedure performed by a device-RGB to Lab conversion LUT creating section and a Lab to CMYK conversion LUT creating section according to an exemplary embodiment of the present invention.

FIG. 7 illustrates an example of a memory structure of a device-RGB to CMYK converting unit according to an exemplary embodiment of the present invention.

FIG. 8 is a main flowchart illustrating a processing procedure to be performed by a device-RGB to CMYK converting unit according to an exemplary embodiment of the present invention.

FIG. 9 is a flowchart illustrating a first example of a processing procedure of color separation with gradations.

FIG. 36 illustrates examples of results of color separation with gradations with and without gray balance correction.

DESCRIPTION OF THE EXEMPLARY EMBODIMENTS

In the following, an image processing apparatus according to an exemplary embodiment of the present invention will be described with reference to the drawings.

[Example of Color Matching Processing of Image Processing Apparatus]

Figure 1:
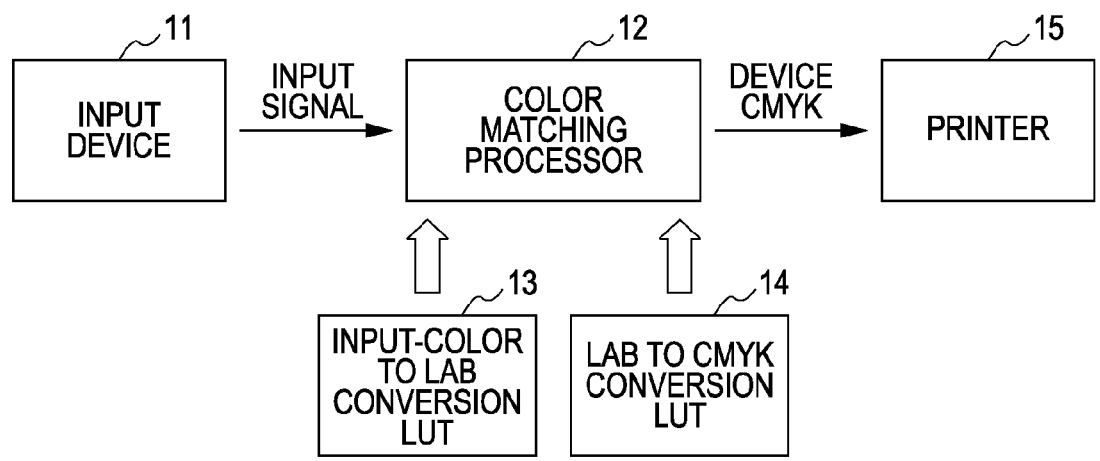
FIG. 1 illustrates an example of a configuration of a system in which color matching between an input device and an output printer according to an exemplary embodiment of the present invention is performed.

FIG. 1 illustrates a block diagram illustrating an example of a processing configuration in which a color matching process is performed on data using a color conversion table obtained by an image processing apparatus according to an exemplary embodiment of the present invention and the processed data is output to a printer.

An input signal supplied from an input device 11 to a color matching processor 12 is an image signal in a color space which is dependent on a certain device. For example, the input signal may be an RGB signal representing an image read from a document by a scanner or may be a CMYK signal to be output to a printer. When the present exemplary embodiment is applied to a copying device, the input signal is an RGB signal representing an image read by a scanner. When proofing is performed, the input signal is a CMYK signal to be output to a printer as a printing destination.

The above input signal is input to the color matching processor 12 and converted into a signal into a Lab color space which is independent of a device, through LUT conversion using an input-color to lab conversion LUT 13. Then, the input signal is converted into a signal in device CMYK color space (device CMYK signal) of a printer 15, through LUT conversion using a lab to CMYK conversion LUT 14. This CMYK signal is sent to the printer 15, so that the printer 15 can output a result of the color matching with the input device 11.

[Hardware Configuration of Controller]

Figure 2:
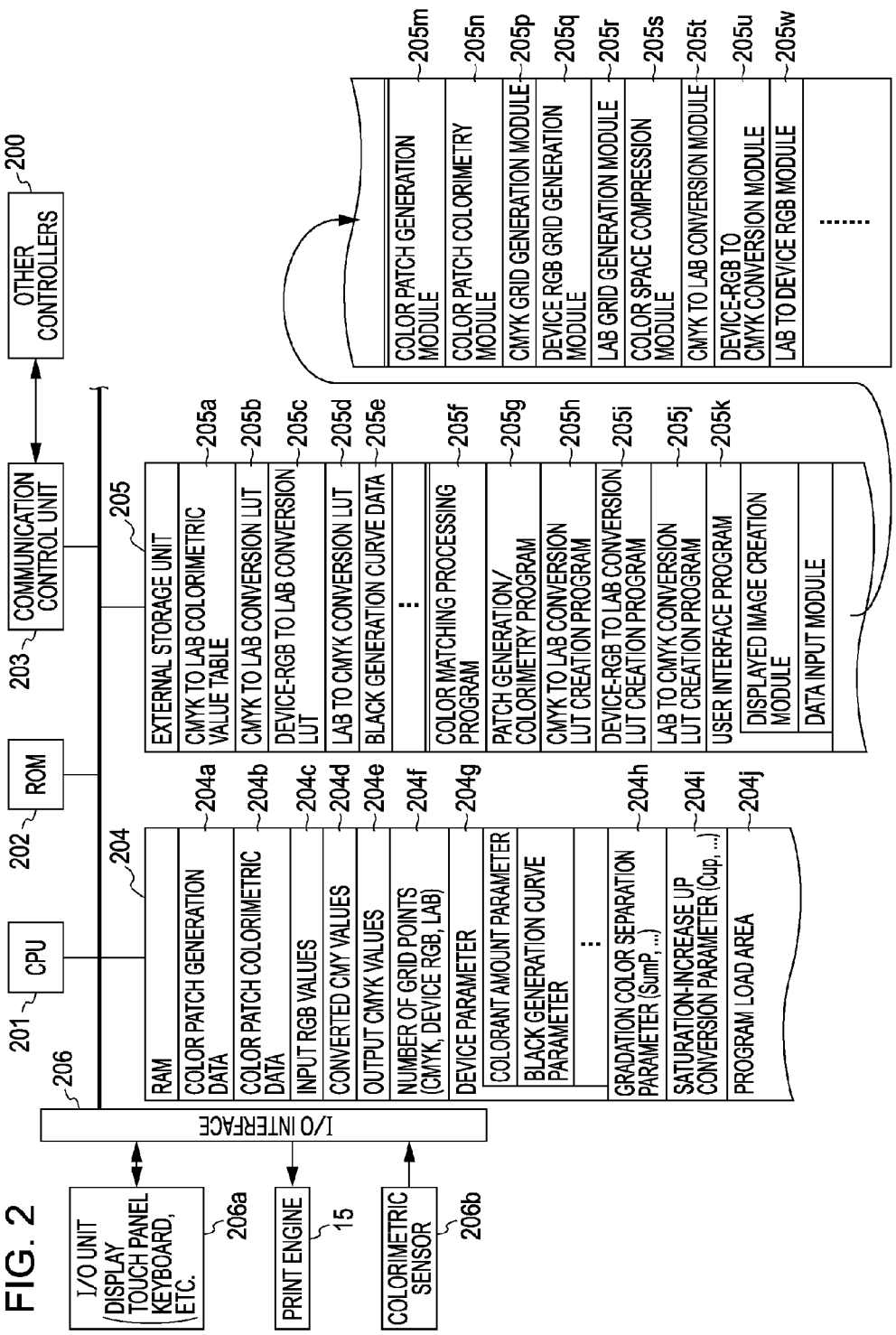
FIG. 2 is a block diagram illustrating an example of a configuration of a controller of an image processing apparatus according to an exemplary embodiment of the present invention.

FIG. 2 is a block diagram illustrating a controller of an image processing apparatus according to an exemplary embodiment of the present invention. Note that FIG. 2 illustrates components which are directly related to the present exemplary embodiment, and general-purpose components of the controller are omitted from the figure.

As illustrated in FIG. 2, the controller of the present exemplary embodiment includes a CPU 201 for controlling operations of the controller, a ROM 202 for storing a boot program, a fixed parameter, or the like, and a communication control unit 203 for controlling communication with other controllers 200. FIG. 2 mainly illustrates control for creating a color conversion table according to the present exemplary embodiment. However, the controller may serve as an integrated system which also performs control of an entire image forming function. The controller may also be configured as a distributed system in which a plurality of CPUs each performing control of a specific function are connected through a communication network.

The controller also has a RAM 204, an external storage unit 205, and an input/output interface 206. The RAM 204 temporarily stores parameters, calculation results, or the like during execution of a program by the CPU 201. The external storage unit 205 may be a disk or the like which stores an application program to be executed by the controller and non-volatile data such as a LUT. The input/output interface 206 interfaces the controller to peripheral devices and units. The input/output interface 206 is connected to an input/output unit 206a including a display, a touch panel, a keyboard, or the like, a print engine 15 for performing image forming processing, and a calorimetric sensor 206b for measuring color patch images.

The RAM 204 is provided with data storage areas 204a to 204j for storing data elements relating to the present exemplary embodiment. The storage area 204a stores data for generating a color patch in the print engine 15. The storage area 204b stores calorimetric data of the color patch measured by the calorimetric sensor 206b. The storage area 204c stores input RGB values to be processed by a device-RGB to CMYK converting unit according to the present exemplary embodiment. The storage area 204d stores CMY values converted from the input RGB values. The storage area 204e stores output CMYK values which are output from the device-RGB to CMYK converting unit.

Figure 3:
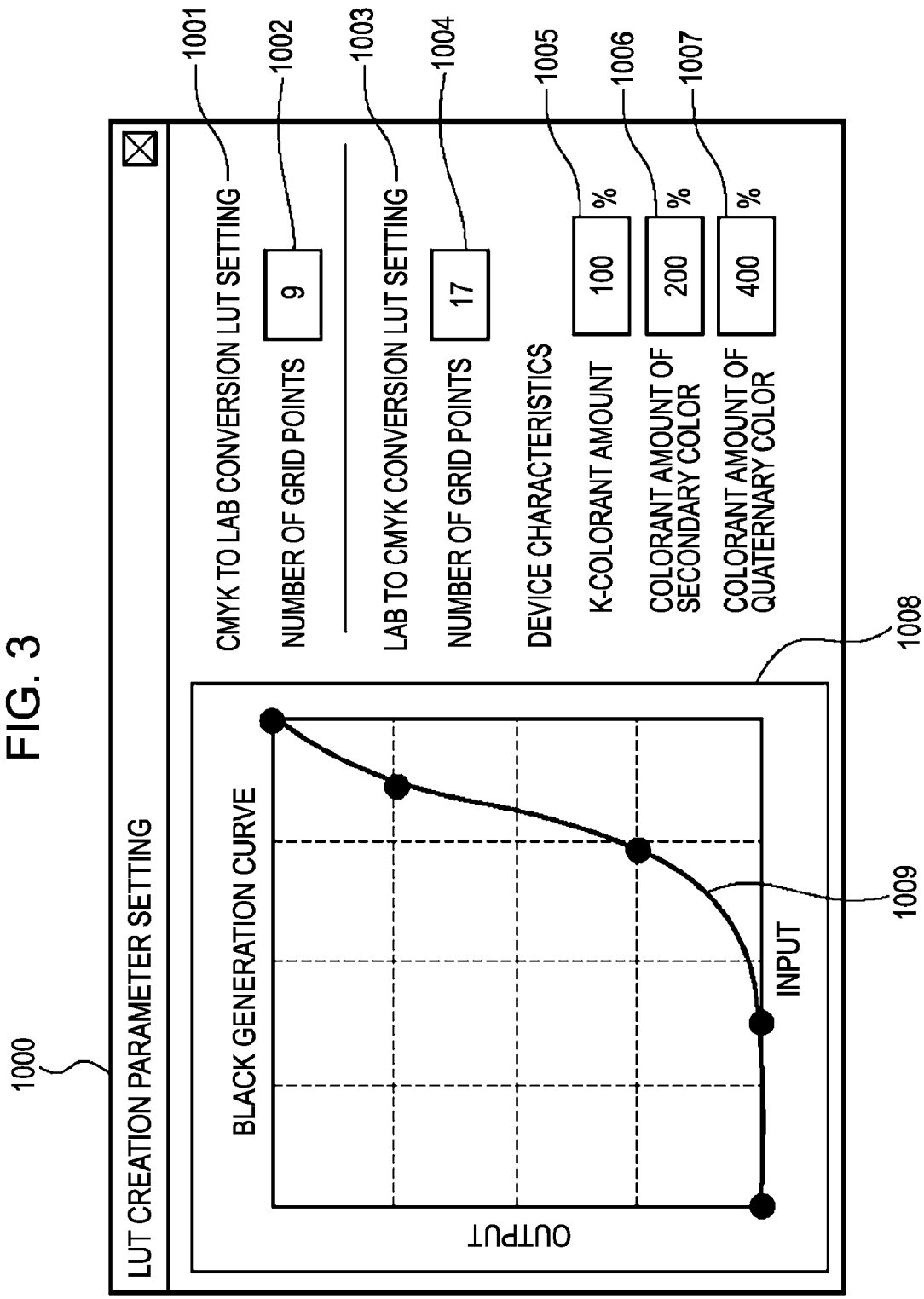
FIG. 3 illustrates an example of a user interface screen for parameter setting performed when a color conversion LUT is created.
Figure 25:
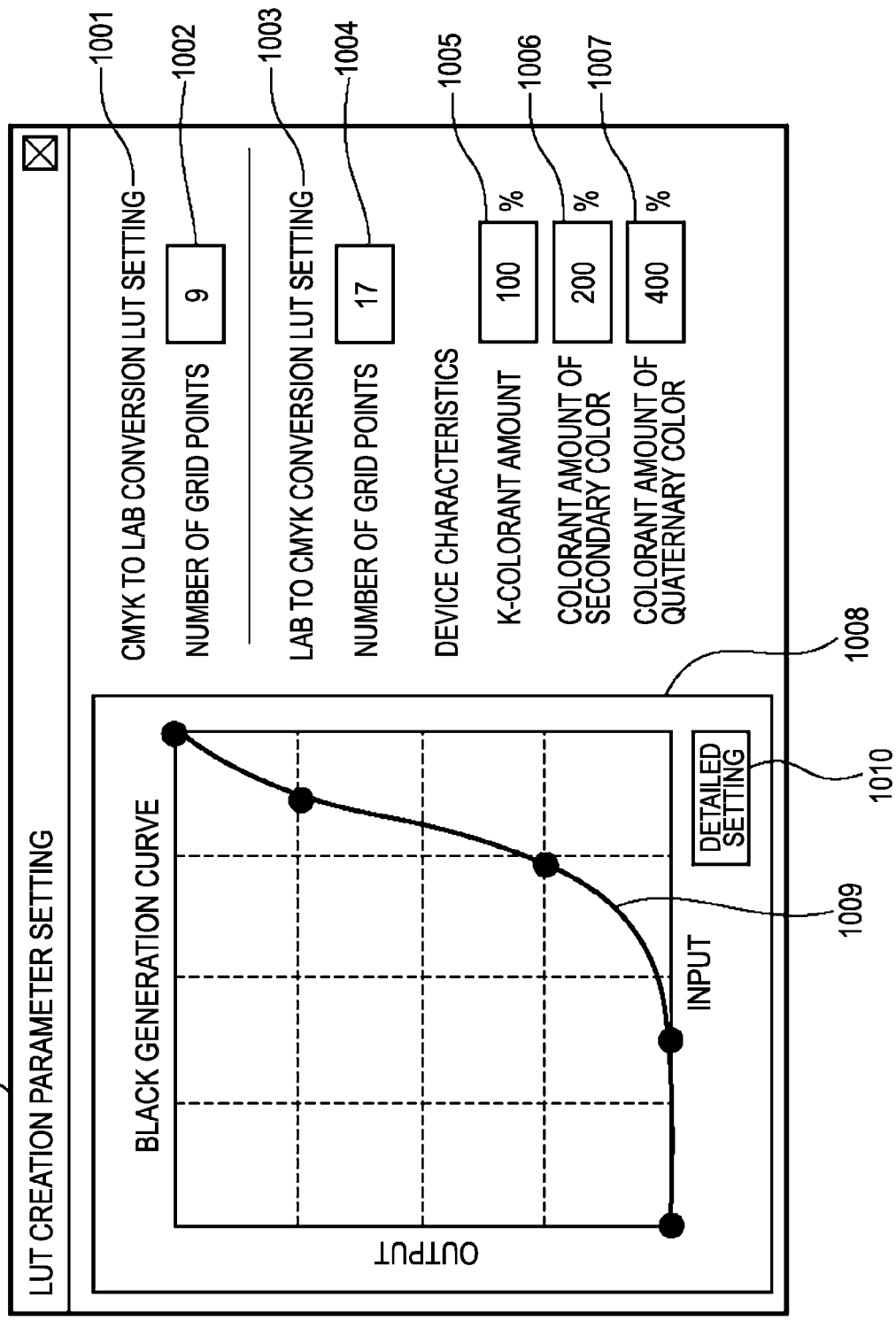
FIG. 25 illustrates an example of a user interface for setting parameters used when a color conversion LUT is created, in which black generation curves can also be set for primary colors.
Figure 26:
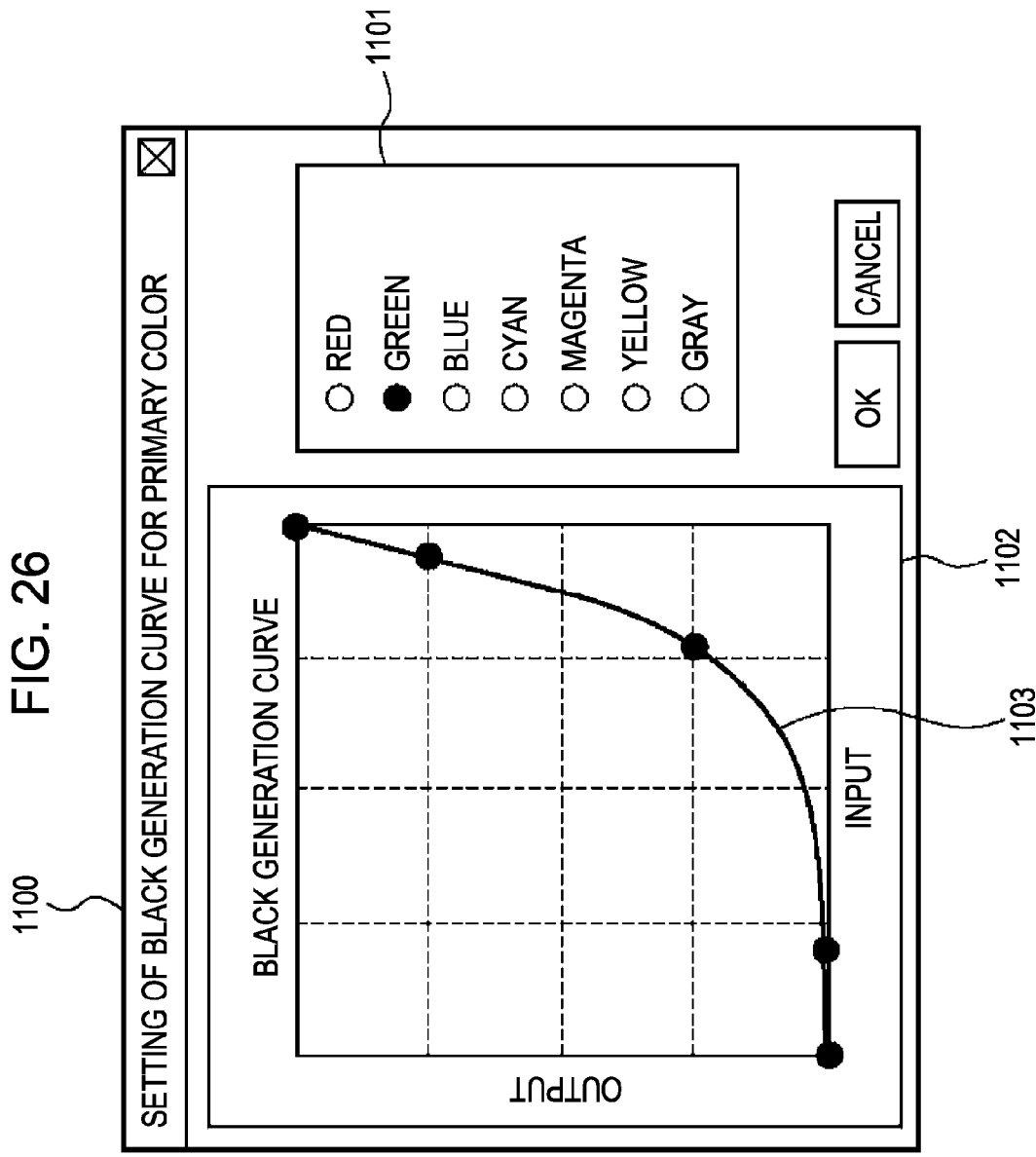
FIG. 26 illustrates an example of a user interface screen for setting a black generation curve for a primary color.

The storage area 204f stores the number of grid points for each of CMYK, device RGB, and Lab. The storage area 204g stores a device parameter set by a user through the input/output unit 206a. Such a parameter may be a parameter relating to a limit of the amount of a colorant, a parameter relating to a black generation curve, or the like. Examples of user interfaces for such parameters are illustrated in FIGS. 3, 25, and 26.

The storage area 204h stores parameters including a total amount of output CMYK colorants SumP which is used for color separation according to the present exemplary embodiment which takes into account gradations. The storage area 204i stores parameters including a saturation-increase coefficient Cup used in saturation-increase conversion according to the present exemplary embodiment. The storage area 204j is loaded with a program to be executed by the CPU 201 from the external storage unit 205. Detailed description of the parameters stored in the storage areas 204h and 204i which is used in the device-RGB to CMYK converting unit of the present exemplary embodiment will be provided below with reference to FIG. 7.

The external storage unit 205 has storage areas 205a to 205w for storing data elements and programs described below. The storage area 205a stores a CMYK-to Lab calorimetric value table created using the color patch generation data 204a and the color patch calorimetric data 205b. The storage area 205b stores a CMYK to Lab conversion LUT created in accordance with the present exemplary embodiment. The storage area 205c stores a device-RGB to Lab conversion LUT created in accordance with the present exemplary embodiment. The storage area 205d stores a Lab to CMYK conversion LUT created in accordance with the present exemplary embodiment. The storage area 205e stores black generation curve data used in the present exemplary embodiment. A black generation curve may be input by a user, or may be prepared in a device or newly created.

The storage areas 205f to 205w store programs and modules constituting some of the programs. For example, the individual programs correspond to creating sections illustrated in FIG. 5 and FIG. 6, and the individual modules correspond to components constituting each of the creating units.

The storage area 205f stores a color matching processing program for performing color matching when an image processing apparatus forms an image. The storage area 205g stores a patch generation/colorimetry program which generates color patch generation data for causing the print engine 15 to form color patch images and creates and stores the CMYK to Lab calorimetric value table 205a on the basis of calorimetric data of the calorimetric sensor 206b. The storage area 205h stores a CMYK to Lab conversion LUT creation program for creating a CMYK to Lab conversion LUT. The storage area 205i stores a device-RGB to Lab conversion LUT creation program for creating a device-RGB to Lab conversion LUT. The storage area 205j stores a Lab to CMYK conversion LUT creation program for creating a Lab to CMYK conversion LUT. The storage area 205k stores a user interface program for interfacing with a user via the input/output unit 206a. The user interface program 205k includes a display image creation module for creating a screen image to be displayed on the display and a data input module for processing data input by the user and storing the user input data in a predetermined data area.

The storage areas 205m to 205w store modules each constituting one or more of the patch generation/colorimetry program 205g, the CMYK to Lab conversion LUT creation program 205h, the device-RGB to Lab conversion LUT creation program 205i, and the Lab to CMYK conversion LUT creation program 205j.

The storage area 205m stores a color patch generation module for creating a color patch. The storage area 205n stores a color patch colorimetry module. The storage area 205p stores a CMYK grid generation module for generating a CMYK grid on the basis of the stored number of grid points 204f. The storage area 205q stores a device-RGB grid generation module for generating a device RGB grid on the basis of the stored number of grid points 204f. The storage area 205r stores a Lab grid generation module for generating a Lab grid on the basis of the stored number of grid points 204f. The storage area 205s stores a color space compression module for compressing a color space. The storage area 205t stores a CMYK to Lab conversion module for converting CMYK data to Lab data. The storage area 205u stores a device-RGB to CMYK conversion module for converting device RGB data to CMYK data. The storage area 205w stores a Lab to device RGB module for converting Lab data to device RGB data.

Processing according to this exemplary embodiment particularly relates to the device-RGB to CMYK conversion module 205u which corresponds to the device-RGB to CMYK converting unit.

(Example of User Interface of the Input/Output Unit 206a)

FIG. 3 illustrates an example of a user interface for setting parameters when a color conversion LUT is created.

As illustrated in FIG. 3, a CMYK to Lab conversion LUT setting field 1001 and a Lab to CMYK conversion LUT setting field 1003 are provided in a LUT creation parameter setting window 1000.

A number of grid points can be set in an entry box 1002 in the CMYK to Lab conversion LUT setting filed 1001. When a number 9 is specified in the entry box 1002, a CMYK to Lab conversion LUT having 9×9×9×9 grid points is created. In the Lab to CMYK conversion LUT setting field 1003, a number of grid points and device characteristics can be set. When a number 17 is specified in an entry box 1004 in this field, a Lab to CMYK conversion LUT having 17×17×17 grid points is created.

The device characteristics include the amount of K colorant, the amount of colorant of a secondary color (hereinafter also referred to as colorant amount of secondary color), the amount of colorant of a quaternary color (hereinafter also referred to as colorant amount of quaternary color), which are specified in entry boxes 1005 to 1007, respectively. The device characteristics also include a black generation curve 1009 which can be created in a black generation curve setting field 1008. The maximum amount of each of the above colorant amounts (colorant amount limit) can be specified as a percentage. The black generation curve setting field 1008 also allows a user to freely adjust black level. For example, the user can move marks represented by filled dots in the black generation curve setting field 1008 and connect the individual marks in accordance with a predetermined scheme such as a spline function, so as to create the black generation curve 1009 which is a free-form curve.

(Example of Black Generation Curve)

Figure 4:
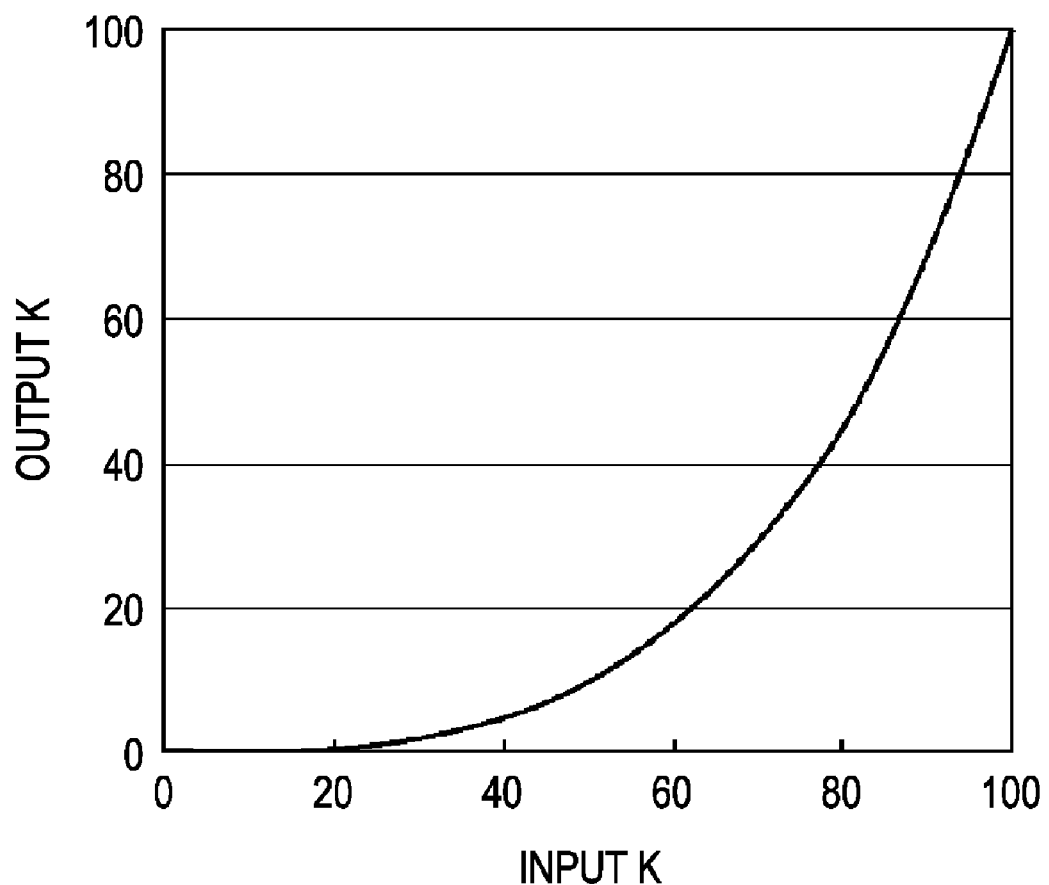
FIG. 4 illustrates an example of a black generation curve (function).

FIG. 4 illustrates an example of a black generation curve, in which the amount of a black colorant (hereinafter also referred to as a black amount) before conversion (abscissa) is plotted versus the black amount after conversion (ordinate). This curve is expressed as y=f(x), where y represents the output black amount and x represents the input black amount. Various types of functions may be employed for the function f, such as a power function, a spline function represented by a free curve, or the like. The curve shown in FIG. 4 illustrates a case where the black amount which is suppressed in a low-density portion in an image is significantly increased in a high-density portion (a shadow portion) in the image. Thus, the user can freely adjust the black amount as desired using the process described above.

[Configuration and Operations of Color Conversion LUT Creating Sections]

Figure 5:
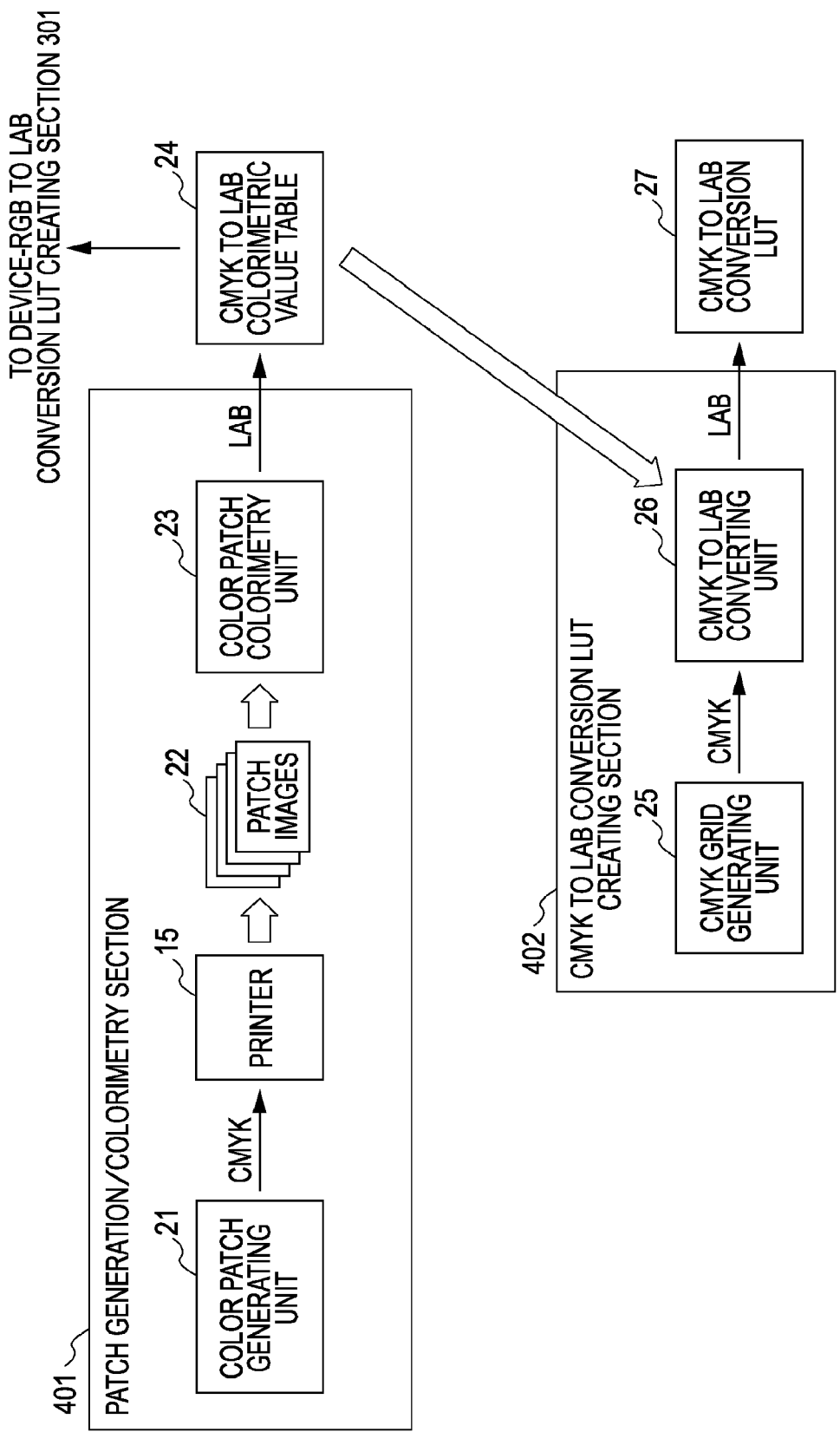
FIG. 5 illustrates a processing procedure performed by a patch generation/colorimetry section and a CMYK to Lab conversion LUT creating section according to an exemplary embodiment of the present invention.

In the following, a configuration of a color conversion LUT creating section used in the color matching processing illustrated in FIG. 1 and operations to be performed by the color conversion LUT creating section for creating a color conversion LUT will be described. FIGS. 5 and 6 illustrate examples of operations of color conversion LUT creating sections for creating the lab to CMYK conversion LUT 14 described above.

(Creation of CMYK to Lab Conversion LUT)

FIG. 5 illustrates operations of a patch generation/colorimetry section 401 and a CMYK to Lab conversion LUT creating section 402.

In the patch generation/colorimetry section 401, a color patch generating unit 21 creates CMYK color patches. These color patches are output to the printer 15 without undergoing color management processing, and thus patch images 22 are output. Then, a color patch colorimetry unit 23 (the calorimetric sensor 206*b*) measures the color patch images and obtains Lab values. Then the CMYK values generated by the color patch generating unit 21 are associated with the Lab values obtained by the color patch colorimetry unit 23, and thus a CMYK to Lab calorimetric value table 24 is obtained. This calorimetric value table is used in the CMYK to Lab conversion LUT creating section 202 and a device-RGB to Lab conversion LUT creating section 301.

In the CMYK to Lab conversion LUT creating section 402, a CMYK grid generating unit 25 generates grid data of CMYK. At this time, the number of grid points is determined on the basis of a number input in the entry box 1002 of the CMYK to Lab conversion LUT setting field 1001 of the user interface illustrated in FIG. 3. When a number 9 is specified, a 9×9×9×9 CMYK gird is created. The generated grid data is input to a CMYK to Lab converting unit 26 for calculating corresponding Lab values by interpolation processing using the CMYK to Lab conversion calorimetric value table 24. As a result, a CMYK to Lab conversion LUT 27 is created.

This CMYK to Lab conversion LUT 27 can be used as an input-color to Lab conversion LUT 13 when the printer 15 serves as the input device 11.

(Creation of Device-RGB to Lab Conversion LUT and Lab to CMYK Conversion LUT)

FIG. 6 illustrates operations of the device-RGB to Lab conversion LUT creating section 301 and a Lab to CMYK conversion LUT creating section 302.

In the device-RGB to Lab conversion LUT creating section 301 a device RGB grid generating unit 31 generates RGB grid values corresponding to, for example, data of a 17×17×17 grid. The device RGB values are converted into device CMYK values by a device RGB to CMYK converting unit 32. At this time, the device characteristics input in the Lab to CMYK conversion LUT setting field 1003 of the user interface of FIG. 3 are used as input parameters. Then, a CMYK to Lab converting unit 33 converts the CMYK values into Lab values by referring to the CMYK to Lab calorimetric value table 24 created by the patch generation/colorimetry section 201. For this conversion, the same conversion scheme as the one employed in the CMYK to Lab converting unit 26 may be used. Alternatively, the CMYK to Lab converting unit 33 may use the CMYK to Lab converting unit 26 for the above conversion. The Lab values are then associated with the RGB values generated by the device RGB grid generating unit 31, and thus a device-RGB to Lab conversion LUT 34 is obtained.

In the Lab to CMYK conversion LUT creating section 302, a Lab grid generating unit 35 generates Lab grid values, which correspond, for example, to data of a 17×17×17 grid. Then, a color space compressing unit 36 compresses the Lab values so as to be within the color reproduction range of the printer (print engine) 15. Then, a Lab to device RGB converting unit 37 converts the Lab values into device RGB values by referring to the device-RGB to Lab conversion LUT 34. The device RGB values are converted into CMYK values of the printer 15 by a device-RGB to CMYK converting unit 38. At this time, the same conversion scheme as one employed in the device-RGB to CMYK converting unit 32 is used for the conversion. Alternatively, the device-RGB to CMYK converting unit 38 may use the device-RGB to CMYK converting unit 32 for the conversion. The CMYK values are associated with the Lab values generated by the Lab grid generating unit 35, and thus the Lab to CMYK conversion LUT 39 is created.

[Configuration of Device-RGB to CMYK Conversion Unit]

This exemplary embodiment particularly relates to a configuration and operations of a device RGB to CMYK conversion unit, of which the details will be described below. In the following, the details of the device-RGB to CMYK converting units 32 and 38 will be described. The device-RGB to CMYK converting units 32 and 38 are hereinafter simply referred to as the device-RGB to CMYK converting unit unless it is necessary to distinguish them from one another.

The device-RGB to CMYK converting unit converts device RGB values to CMYK values of an output device (e.g., printer 15), taking into account a black generation curve and a limit of the amount of colorants. Note that each of the values of RGB, CMY, and CMYK is expressed as a percentage (ranging from 0% to 100%).

(Details of Memory Structure Constituting Device-RGB to CMYK Converting Unit)

FIG. 7 provides further details of components relating to the device-RGB to CMYK converting unit, among the components of the RAM 204 and the external storage unit 205 illustrated in FIG. 2. In FIG. 7, similar components to those in FIG. 2 are designated by the same reference numerals, and the description of these components will not be repeated.

In the RAM 204, a storage area 204k stores parameters constituting a CMY color solid. A storage area 204m stores a gradation curve table created or transformed during processing according to the present exemplary embodiment.

FIG. 7 also illustrates the details of the gradation color separation parameters 204h and the saturation-increase conversion parameters 204i shown in FIG. 2.

The gradation color separation parameters 204h include, for example, a sum of CMYK values (SumP), a threshold of a colorant amount (e.g., 300%), a gray line connecting white and black, six-primary-color curve, a user-input black generation curve, and an automatic black generation curve.

The saturation-increase conversion parameters 204i include, for example, a spread parameter (sp), an emphasis parameter (em), a gray balance correction parameter (gc1), a gray balance correction parameter (gc2), and a colorant amount parameter (tac).

A configuration of the device-RGB to CMYK conversion module 205u in the external storage unit 205 is illustrated in more detail in FIG. 7.

The device-RGB to CMYK conversion module 205u includes a CMY color solid generation module 2051 for generating CMY color solid parameters, a gradation curve table generation module 2052 for generating a gradation curve table, and an RGB to CMY conversion module 2053 for converting RGB data to CMY data.

The device-RGB to CMYK conversion module 205u also includes a color separation module 2054 for performing color separation which takes into account gradations, according to the present exemplary embodiment. This color separation module 2054 includes a CMYK colorant amount calculation module, a black generation curve correction module, an output-K calculation module, and a CMY extraction module. These modules correspond to individual processing steps in a flowchart described below.

The device-RGB to CMYK conversion module 205u also includes a saturation-increase conversion module 2055 for performing conversion for increasing saturation according to the present exemplary embodiment. The saturation-increase conversion module 2055 includes a spread parameter calculation module, an emphasis parameter calculation module, a gray line parameter calculation module, a point Black parameter calculation module, a colorant amount parameter calculation module, and a CMY value correction module. These modules correspond to individual processing steps in a flowchart described below.

[Processing Procedure of Device-RGB to CMYK Converting Unit]

FIG. 8 is a main flowchart illustrating a processing procedure performed by the device-RGB to CMYK converting unit.

In initial setting, at Step S100, parameters are set. These parameters correspond to the device characteristics to be set in the Lab to CMYK conversion LUT setting field 1003 of FIG. 3. These parameters are set as follows.

LimK: a limit of the amount of a colorant of black (K) (value of the K-colorant amount set in the entry box 1005)

Lim2: a limit of the amount of a colorant of a secondary color (value of the colorant amount of a secondary color set in the entry box 1006)

Lim4: a limit of the amount of a colorant of a quaternary color (value of the colorant amount of a quaternary color set in the entry box 1007)

Black generation curve (function): the black generation curve 1009 set in the black generation curve setting field 1008.

At Step S101, RGB values are converted into CMY values using the following equations.

$C = 100 - R$ $M = 100 - G$ $Y = 100 - B$

At Step S102, determination as to whether an input color is white or black is performed on the basis of the following criteria.

White: $C = M = Y = 0$

Black: $C = M = Y = 100$

When the input color is determined to be white or black (YES in Step S102), the following CMY to CMYK conversion is performed on the basis of the following expressions at Step S103 and the processing procedure proceeds to Step S107.

White: $(C, M, Y, K) = (0, 0, 0, 0)$

Black: $(C, M, Y, K) = (LimCMY, LimCMY, LimCMY, LimK)$, where $LimCMY = (Lim4 - LimK)/3$ LimCMY represents a colorant amount of each of CMY obtained when black is included in four output CMYK colors (total colorant amount = Lim4) after the conversion while the colorant amount limits described above are taken into account.

When the input color is neither white nor black (NO in Step S102), color separation that takes into account gradations (hereinafter also referred to as color separation with gradations) is performed at Step S104, and then saturation-increase conversion is performed at Step S105 with a view to increasing the color reproduction range in a shadow portion in an image. Processing procedures of the color separation with gradation (Step S104) and the saturation-increase conversion (Step S105) will be described below in conjunction with their modification examples.

At Step 106, the output CMYK values obtained in Step S105 are adjusted. Each of the output CMYK values is adjusted so as to be, if not, within the range of the corresponding colorant amount limit. In addition, each of the CMYK values is adjusted so that the sum of the individual CMYK values is a calculated value (K value is constant), which will be described below. Thus, the final output CMYK values are obtained.

At Step S107, if there remain input RGB values to be processed, the processing of Step S101 is performed on the RGB values. When all of the input RGB values are converted into CMYK values, the processing procedure is terminated.

[Color Separation with Gradations]
(First Example of Color Separation)

FIG. 9 is a flowchart illustrating a first example of a processing procedure of color separation which is performed while gradations are taken into account (Step S104 in FIG. 8).

Figure 10:
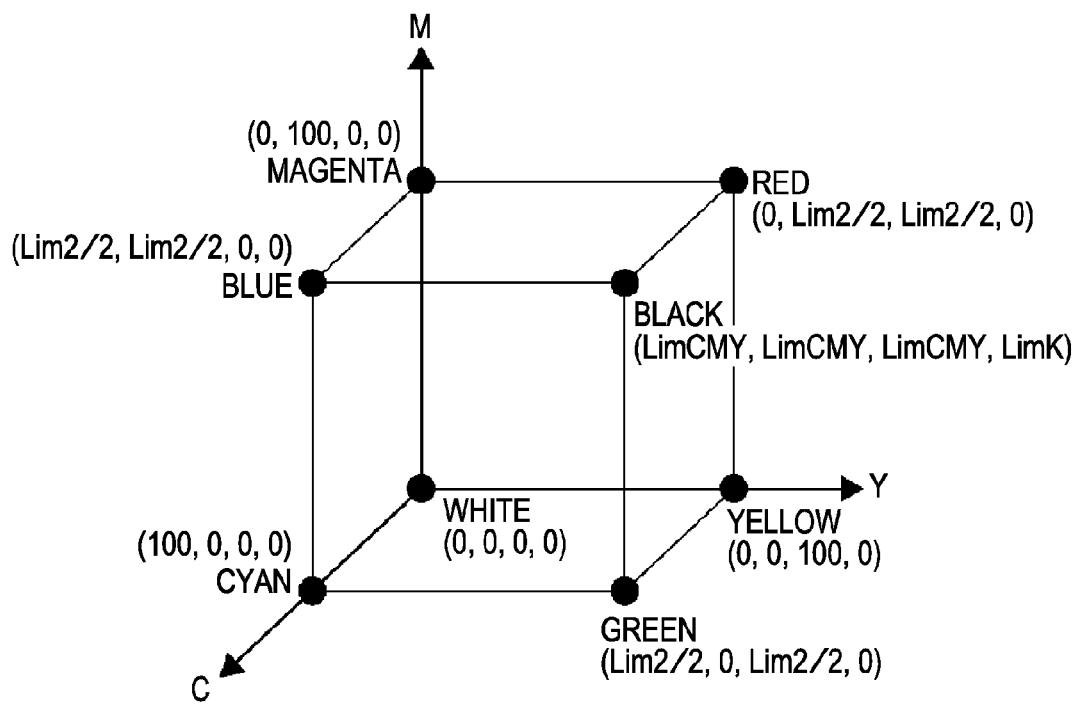
FIG. 10 illustrates a CMY color solid used in CMY to CMYK conversion.

At Step S200, a CMY color solid is created as illustrated in FIG. 10 on the basis of the colorant amount limits (Lim2, Lim4, LimK) and LimCMY. Each of the vertices of the color solid representing White, Red, Green, Blue, Cyan, Magenta, Yellow, or Black has a correspondence relationship in terms of input CMY and output CMYK as shown below.

White: (C, M, Y)=(0, 0, 0)/(C, M, Y, K)=(0, 0, 0, 0)
Red: (C, M, Y)=(0, 100, 100)/(C, M, Y, K)=(0,Lim2/2, Lim2/2, 0)
Green: (C, M, Y)=(100, 0, 100)/(C, M, Y, K)=(Lim2/2, 0, Lim2/2, 0)
Blue: (C, M, Y)=(100, 100, 0)/(C, M, Y, K)=(Lim2/2, Lim2/2, 0, 0)
Cyan: (C, M, Y)=(100, 0, 0)/(C, M, Y, K)=(100, 0, 0, 0)
Magenta: (C, M, Y)=(0, 100, 0)/(C, M, Y, K)=(0, 100, 0, 0)
Yellow: (C, M, Y)=(0, 0, 100)/(C, M, Y, K)=(0, 0, 100, 0)
Black: (C, M, Y)=(100, 100, 100)/(C, M, Y, K)=(LimCMY, LimCMY, LimCMY, LimK)

Figure 11:
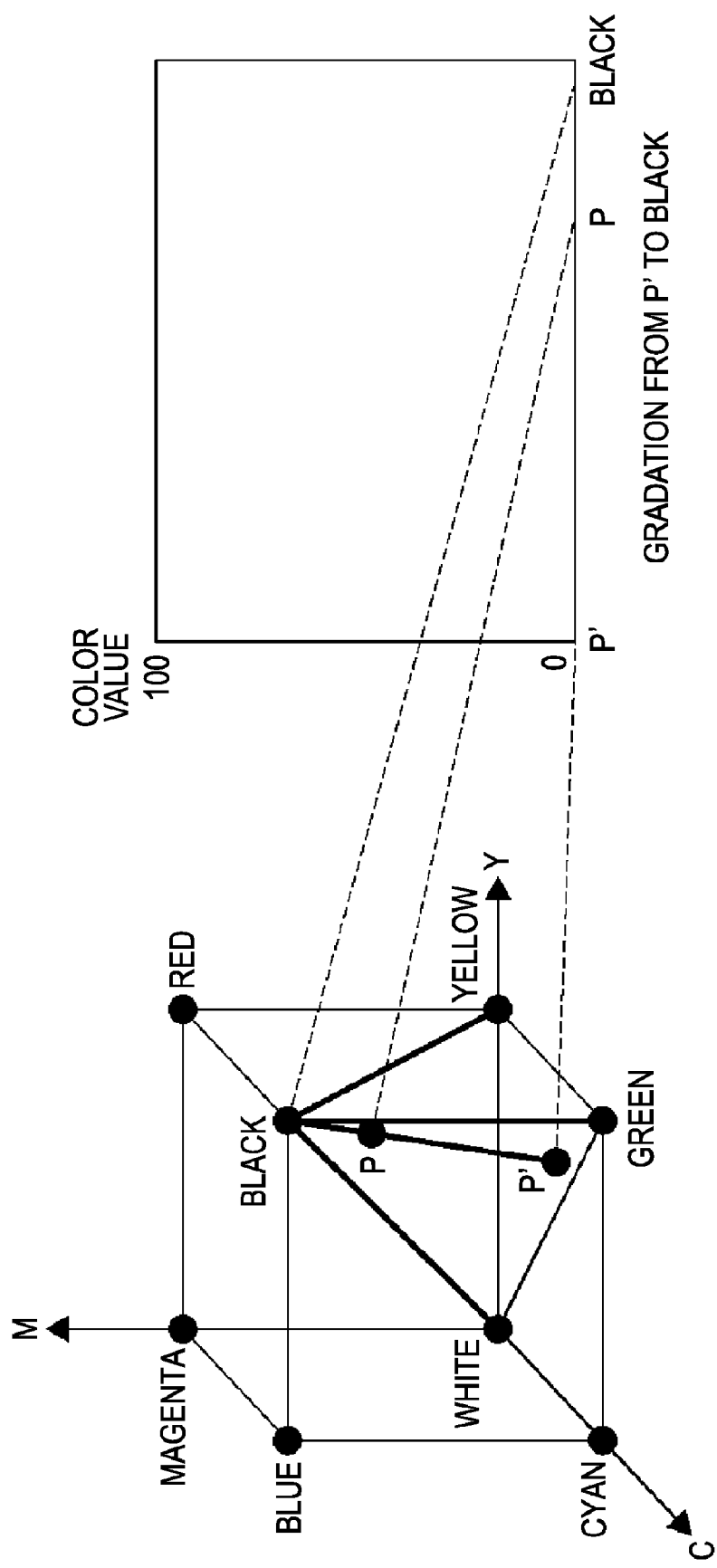
FIG. 11 illustrates a gradation generated for an input point P.

At Step S201, gradation of input is generated. Input CMY are set as a point P(C, M, Y), and a point at which a line extending from the point Black and passing through the point P is intersected with a surface of the color solid is set as P'(C', M', Y'), as illustrated in FIG. 11. CMYK values corresponding to the point P and the point P' are set as (C1, M1, Y1, K1) and (C'1, M'1, Y'1, K'1), respectively. Thus, the gradation from the point P' (at least one of the CMY values is 0) through the input point P to the point Black can be obtained, as illustrated in FIG. 11.

At Step S202, a total amount of output CMYK colorants (SumP=(C1+M1+Y1+K1)) at the point P is calculated.

The CMY color solid illustrated in FIG. 10 can be divided into six tetrahedrons having the following vertices.

White-Cyan-Green-Black
White-Blue-Cyan-Black
White-Magenta-Blue-Black
White-Red-Magenta-Black
White-Yellow-Red-Black
White-Green-Yellow-Black The vertices of a tetrahedron to which the point P belongs are White-Green-Yellow-Black, as illustrated in FIG. 11. The sum of the CMYK values obtained through tetrahedral interpolation on the basis of the vertices is set as SumP.

Figure 12:
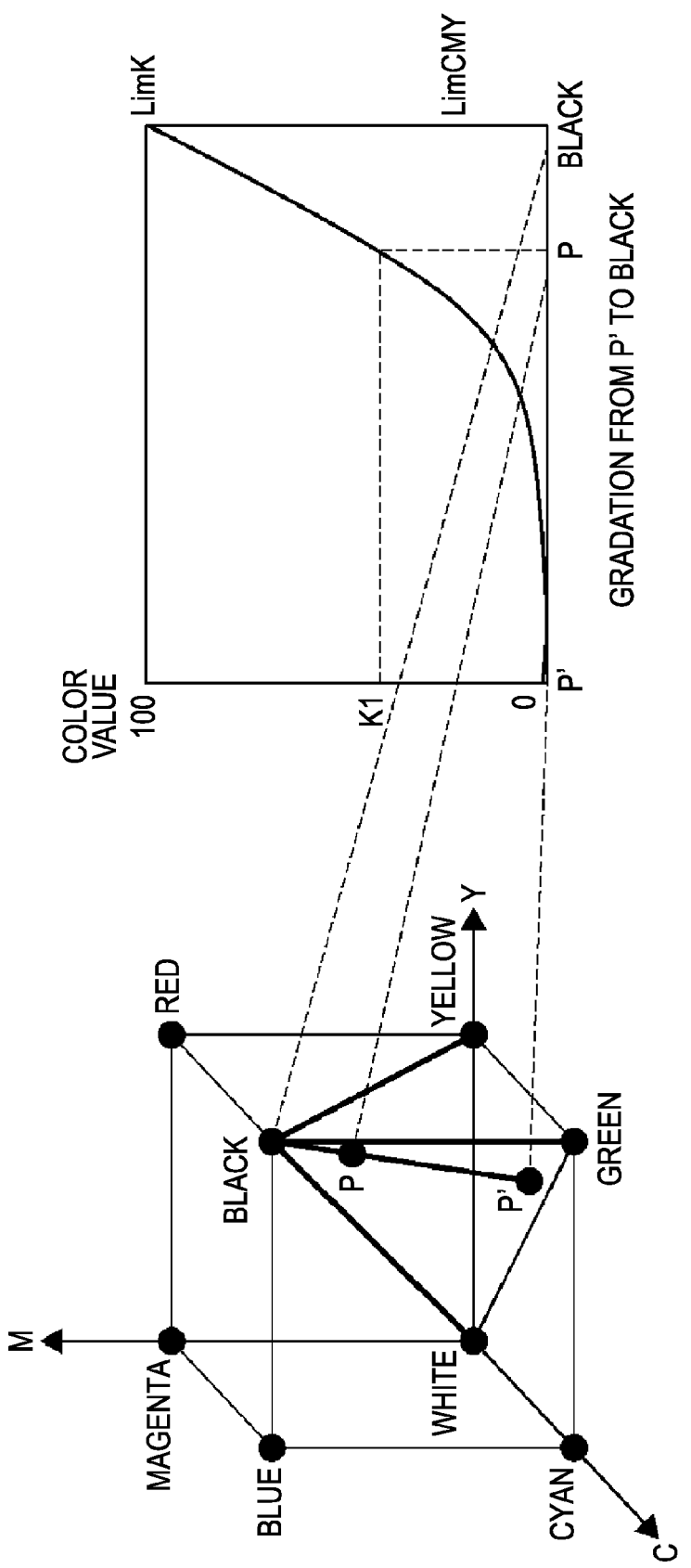
FIG. 12 illustrates a black generation curve set with respect to the gradation in FIG. 11.

At Step S203, an output K value (final value obtained after conversion) is determined. As illustrated in FIG. 12, an output K value (K1) at the point P can be obtained by associating the abscissa of the black generation curve (input) with the gradation from the point P' to the point Black (the point P corresponds to 0 input and the point Black corresponds to 100 input). Specifically, the output value K1 is obtained when input of the black generation function is defined as (distance from P' to P)/(distance from P' to Black).

At Step S204, the individual output CMY values at the point P are extracted on the basis of the ratio to the corresponding input CMY, as follows.

$$C1=(\text{Sum}P-K1)\times(C/(C+M+Y))$$

$$M1=(\text{Sum}P-K1)\times(M/(C+M+Y))$$

$$Y1=(\text{Sum}P-K1)\times(Y/(C+M+Y))$$

Figure 13:
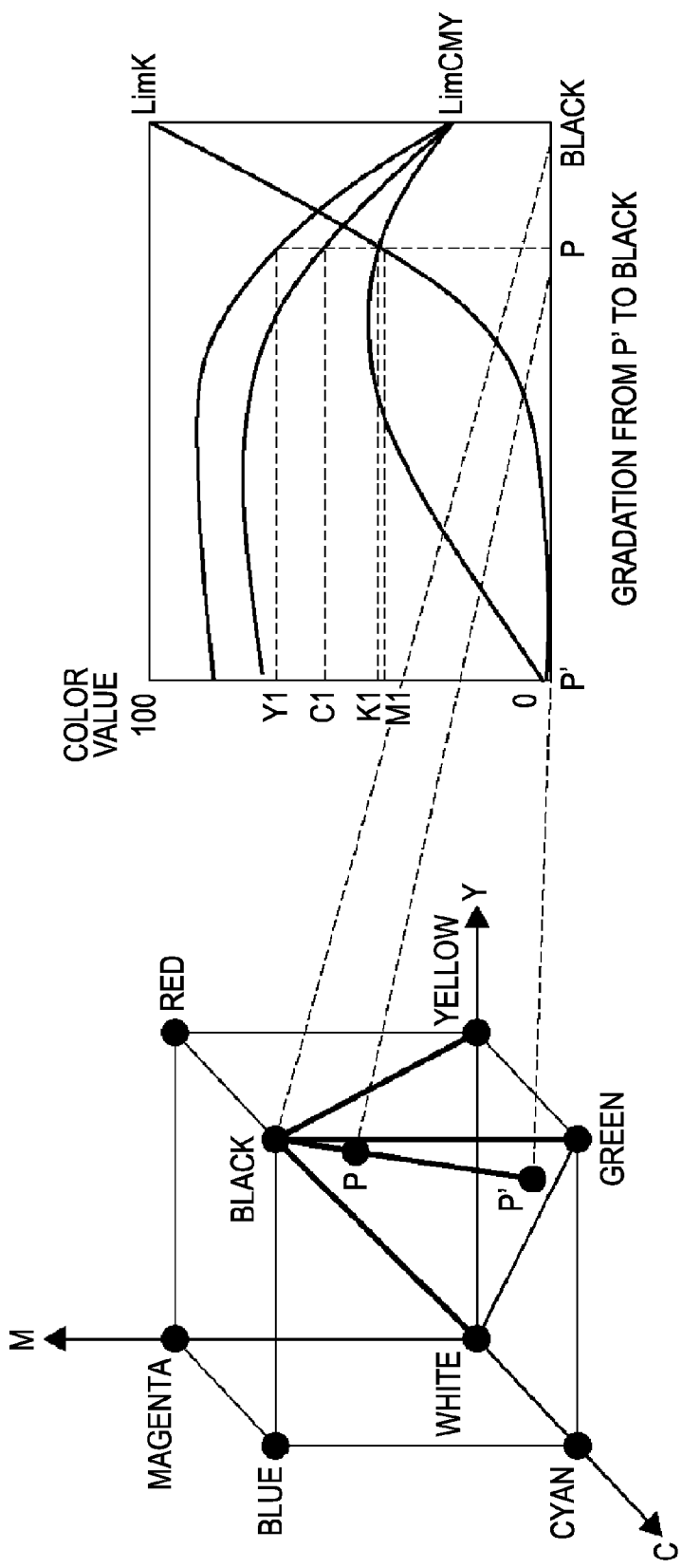
FIG. 13 illustrates a case where the individual CMY values are defined with respect to the gradation in FIG. 12.

FIG. 13 illustrates an example of color separation with gradations after each of the output CMY values is extracted.

In the first example of color separation described above, gradations are taken into account, and thus the values C1, M1, Y1, and K1 are obtained.

In FIGS. 11 to 13, the entire gradations are shown for ease of description. However, it is not necessary to calculate the entire gradations, and only gradations corresponding to the input point P should be calculated.

(Second Example of Color Separation)

A total colorant amount of output CMYK may adversely affect color reproduction and gradation reproducibility. For example, there is a technique in which a total output CMYK colorant amount is linearly increased from a highlight portion to a shadow portion. This technique of determining the total colorant amount may be effective when a sufficient amount of colorants can be used (e.g., a limit of 300% or greater). However, when a high degree of restriction is imposed on the colorant amount (e.g., a limit of less than 300%), the colorant amount may not be sufficient to reproduce a shadow portion in an image, resulting in a narrow color reproduction range (color gamut) of a printer.

Figure 14:
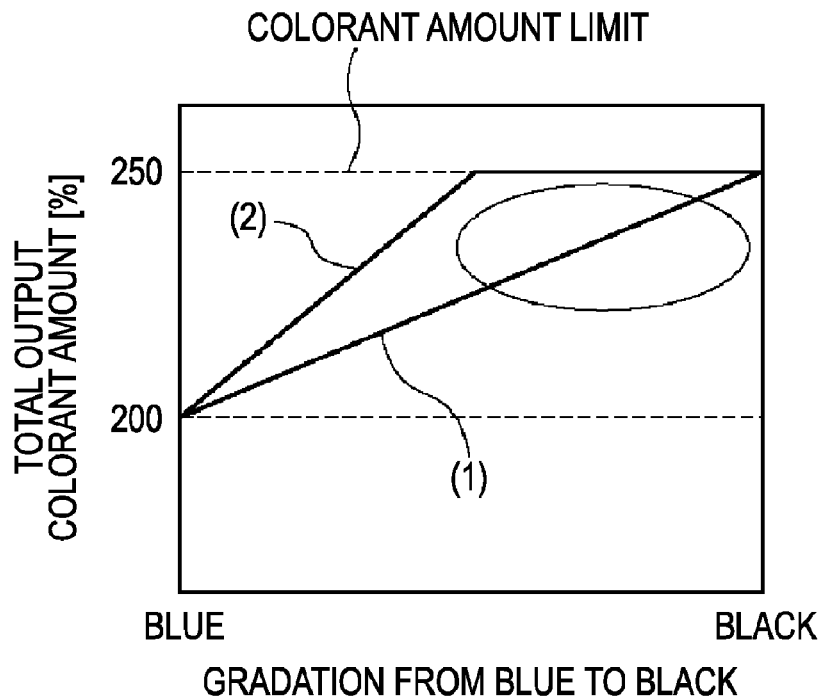
FIG. 14 illustrates a transition of a total output colorant amount in a gradation from Blue to Black when a limit of a quaternary colorant amount Lim4 is 250%.
Figure 15:
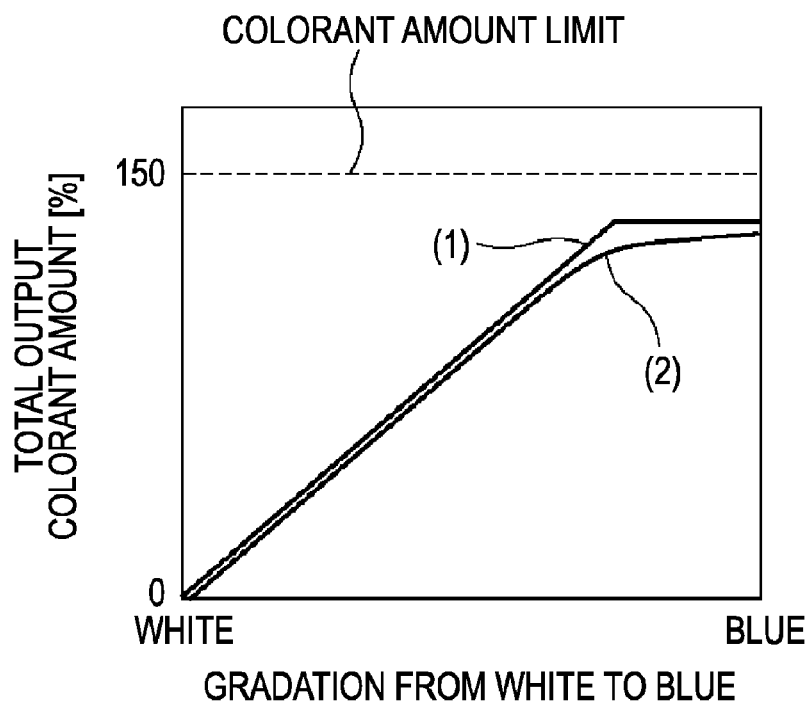
FIG. 15 illustrates a transition of a total output colorant amount in a gradation from White to Blue when a limit of a quaternary colorant amount Lim4 is 150%.

For example, FIG. 14 illustrates change in a total colorant amount when the total colorant amount is linearly increased in a gradation from Blue to Black, as indicated in a line (1) in FIG. 14. In this example, the limit of a colorant amount for a secondary color is 200% and the limit of a colorant amount for a quaternary color is 250%. However, with these limits, the amount of colorants to be used for reproducing a shadow portion, which is indicated by a circle in FIG. 14, is insufficient, which results in a narrow color reproduction range. To overcome this, the total output CMYK colorant amount can be increased so as to be equal to a total colorant amount of input CMY and then clipped at the limit, as indicated by a line (2) in FIG. 14. However, as illustrated in FIG. 15, when the limit of a colorant amount is less than 200% (150% in the example of FIG. 15), increase in the total colorant amount is stopped in a gradation from white to a secondary color (blue in FIG. 15), which causes discontinuity of gradation, as indicated by a line (1) in FIG. 15. To overcome this, it is necessary to maintain the continuity of gradation by nonlinearly changing the total colorant amount.

(Second Example of Color Separation)

In a second example of color separation, the manner in which a total colorant amount is determined is changed on the basis of a limit of colorant amount. With this arrangement, a difference in characteristics between color printers can be compensated for and a conversion table which realizes precise color reproduction based on calorimetric data with any color printer can be created. In addition, color conversion processing can be realized, which maintains a color reproduction range as much as possible and thus prevents deterioration of gradation reproducibility even when a high degree of restriction is imposed on a colorant amount.

(Processing Procedure of Calculation of Total Output CMYK Colorant Amount)

Figure 16:
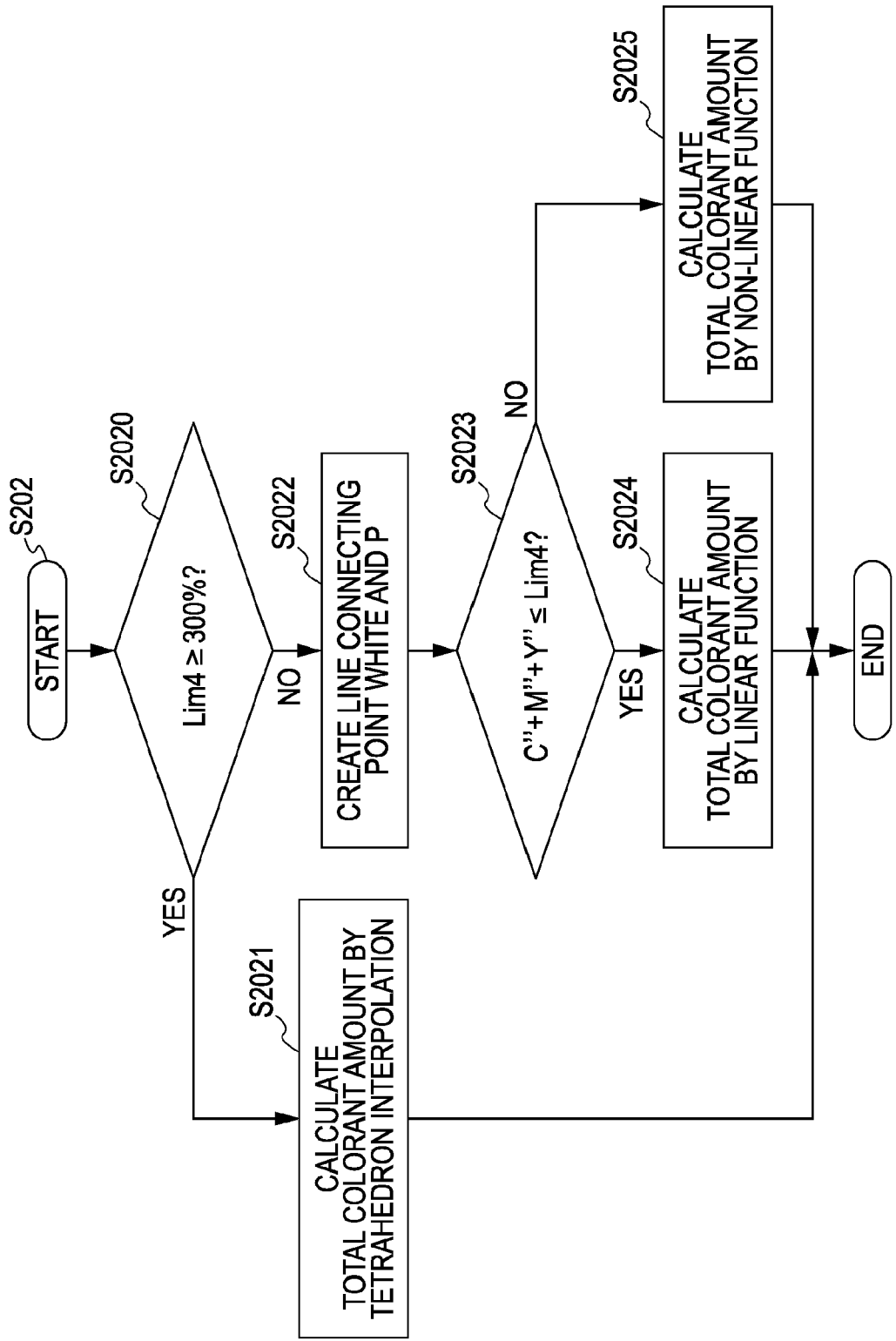
FIG. 16 is a flowchart illustrating a processing procedure of total CMYK colorant amount calculation processing in a second example of color separation with gradations.

FIG. 16 is a flowchart illustrating a processing procedure for calculating a total colorant amount of output CMYK.

Some cases are defined on the basis of a colorant amount limit of a quaternary color Lim4. At Step S2020, when it is determined that Lim4 is 300% or greater (YES in Step S2020), the total colorant amount is calculated by tetrahedral interpolation in Step S2021.

The CMY color solid illustrated in FIG. 10 can be divided into six tetrahedrons having the following vertices, as in the case of the first example.

White-Cyan-Green-Black
White-Blue-Cyan-Black
White-Magenta-Blue-Black
White-Red-Magenta-Black
White-Yellow-Red-Black
White-Green-Yellow-Black In the example of FIG. 11, the point P belongs to the tetrahedron having the vertices of White-Green-Yellow-Black. A sum of CMYK values obtained by tetrahedral interpolation based on these vertices is set as a total colorant amount of output CMYK SumP.

Figure 17:
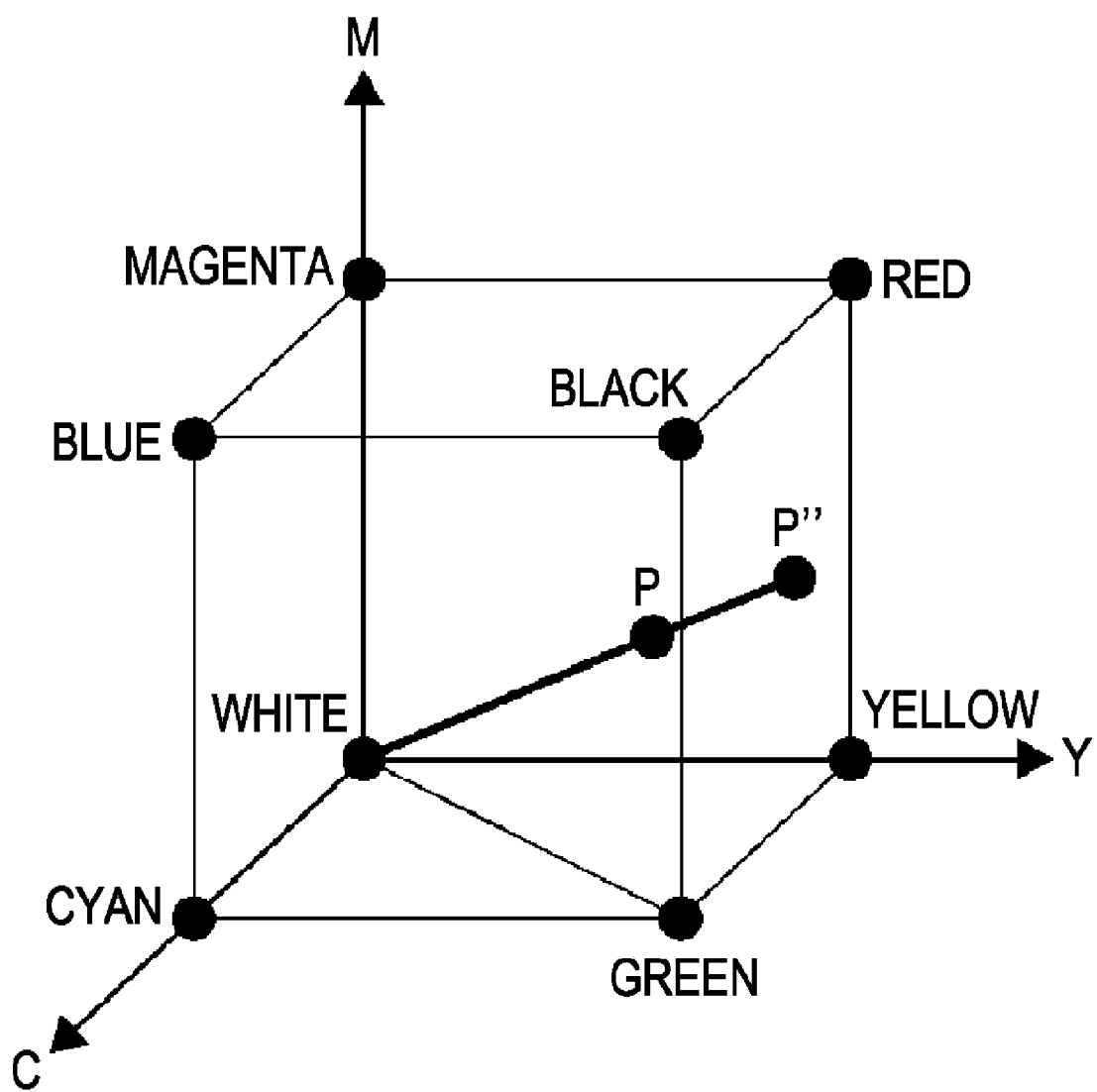
FIG. 17 illustrates the relationship between a point P and a point P" in a CMY color solid.

At this time, when Lim4 is less than 300% (NO in Step S2020), a line extending from a point White and passing through the input point P described above is created at Step S2022, as illustrated in FIG. 17. A point at which the line and a surface of the CMY color solid are intersected is set as P"(C", M", Y"). At Step S2023, the total amount of input colorant amount at the point P" (C"+M"+Y") and Lim4 are compared, and some cases are defined on the basis of the comparison.

Figure 18:
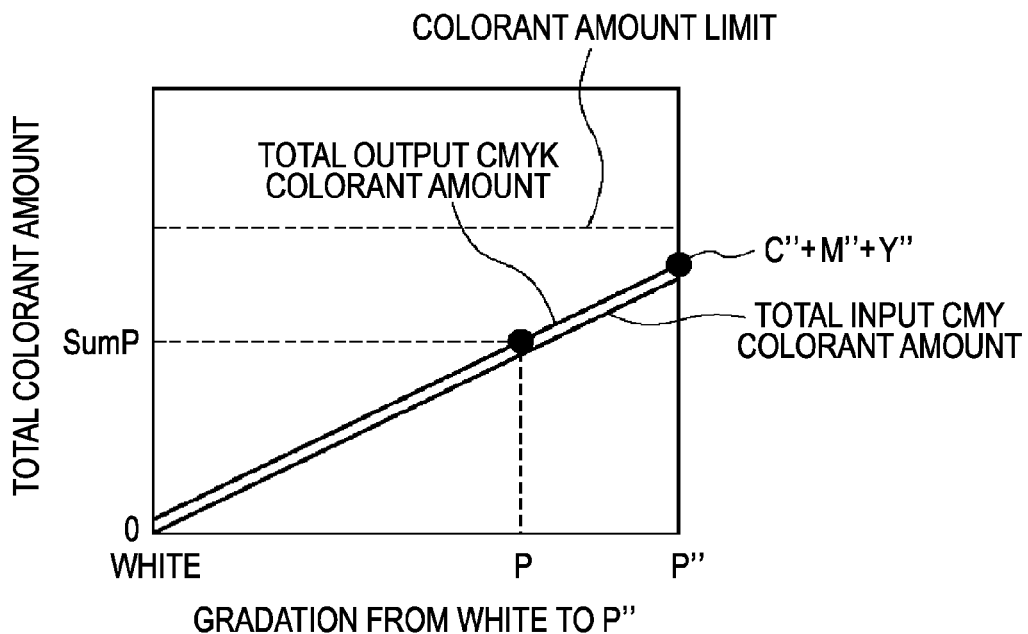
FIG. 18 illustrates a total colorant amount in each of gradations from White to the point P" corresponding to input CMY and output CMYK, where C"+M"+Y"<quaternary colorant amount limit Lim4<300%.

If C"+M"+Y"≦Lim4 (YES in Step S2023), SumP is calculated using a linear function, at Step S2024, as illustrated in FIG. 18. In this case, SumP is equal to the total amount of input CMY at the point P.

Figure 19:
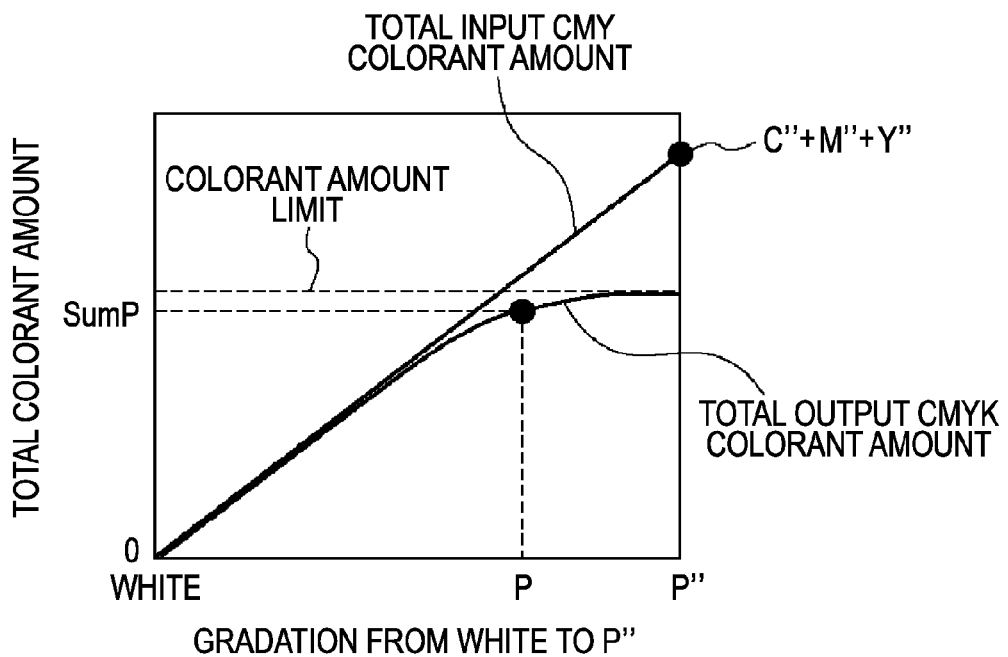
FIG. 19 illustrates a total colorant amount in each of gradations from White to the point P" corresponding to input CMY and output CMYK, where quaternary colorant amount limit Lim4<300%, and Lim4≦C"+M"+Y".

If C"+M"+Y">Lim4 (NO in Step S2023), SumP is calculated using a nonlinear compression function at Step S2025, as illustrated in FIG. 19. As a result, the total colorant amount is increased nonlinearly from White to the point P"', and thus both color reproducibility and gradation reproducibility can be maintained even if a high degree of restriction is imposed on the colorant amount. The nonlinear function may be a spline function, an elliptic function, or the like.

In the second example of color separation, the total output CMYK colorant amount SumP is obtained through the processing described above.

Subsequently, the value of output K (final value after conversion) is determined (Step S203), similarly to the first example described above. Then, the individual output CMY values at the point P are extracted on the basis of the ratio to the corresponding input CMY, as follows (Step S204).

$$C1=(SumP-K1)\times(C/(C+M+Y))$$

$$M1=(SumP-K1)\times(M/(C+M+Y))$$

$$Y1=(SumP-K1)\times(Y/(C+M+Y))$$

In FIGS. 18 and 19, the entire gradations are illustrated. However, it is not necessary to calculate the entire gradations, and only gradations corresponding to the input point P should be calculated.

(Third Example of Color Separation)

In printing, it is not desirable that a human skin color contains a black component, which causes graininess and roughness of an image. Thus, it is necessary to reduce the amount of a black component from a skin color. However, using only a single predetermined black generation curve in color conversion may not satisfy such a need.

In the third example of color conversion, desirable color reproduction can be realized by performing different black generation depending on the hue.

Figure 20:
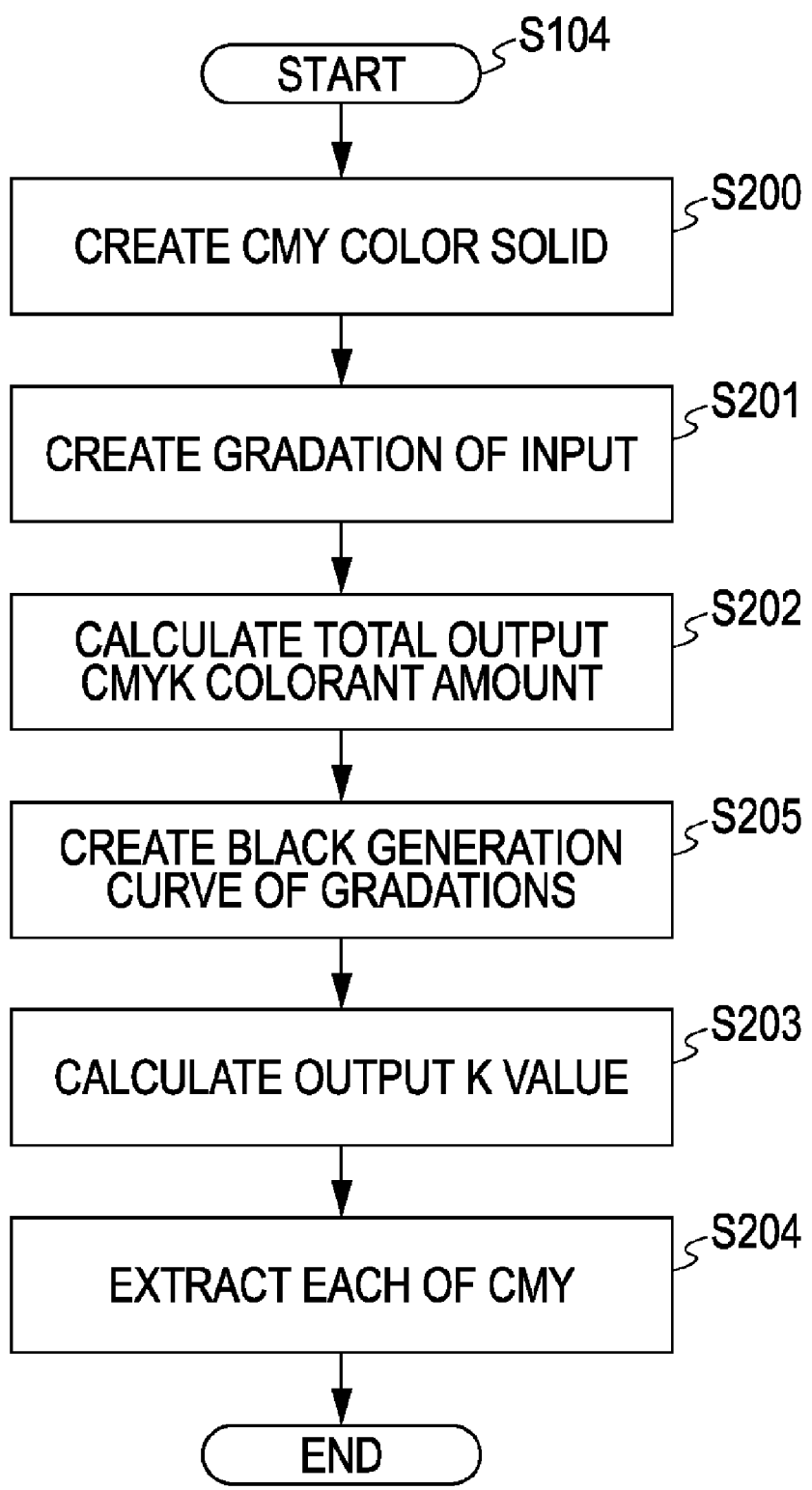
FIG. 20 is a flowchart illustrating a third example of color separation with gradations.

FIG. 20 is a flowchart illustrating a processing procedure of color conversion with gradations (Step S104) according to the third example. In FIG. 20, similar processing steps to those in the first example are designated by the same reference numerals, and thus the detailed description thereof will not be repeated.

At Step S200, a CMY color solid is created on the basis of colorant amount limits (Lim2, Lim4, LimK) and LimCMY described above, as illustrated in FIG. 10. Then, a gradation corresponding to input CMY is created (Step S201). The input CMY are set as a point P(C, M, Y), and a point at which a line extending from the point Black and passing through the point P is intersected with a surface of the color solid is set as P'(C', M', Y). Output CMYK values corresponding to the point P and the point P' are set as (C1, M1, Y1, K1) and (C'1, M'1, Y'1, K'1), respectively. Thus, the gradation from the point P' (at least one of the CMY values is 0) through the input point P to the point Black can be obtained, as illustrated in FIG. 11. Then, a total colorant amount of output CMYK at the point P SumP (C1+M1+Y1+K1) (Step S202) is calculated.

Then, at Step S205, black generation curve corresponding to gradations is generated. The black generation curve 1009 illustrated in FIG. 3, which is specified through the user interface, corresponds to a gray line connecting the point White to the point Black in the color solid in FIG. 10. In addition to this black generation curve from White to Black, in this example, black generation curves which correspond to lines connecting six individual primary colors (Red, Green, Blue, Cyan, Magenta, and Yellow) to Black are set.

Figure 21:
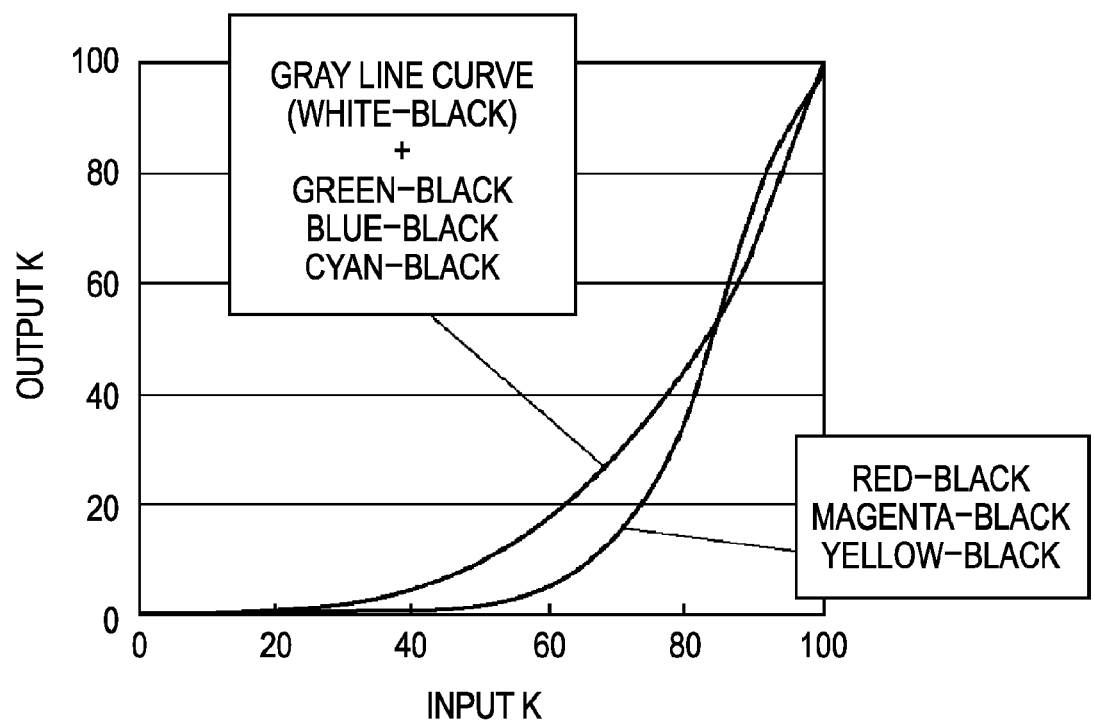
FIG. 21 illustrates an example of a case where a black generation curve is set for each hue.

As illustrated in FIG. 21, the same line as the black generation curve corresponding to the gray line is used for the black generation curves corresponding to Green, Blue, and Cyan. For the black generation curves for the other colors (Red, Magenta, Yellow), another black generation curve is used in which the amount of a black colorant is smaller than the black generation curve of the gray line. This arrangement is based on the concept that the amount of black component contained in a human skin color should be as small as possible. In preparing these seven black generation curves extending from the individual six primary colors to Black, an image processing apparatus may set optimum ones beforehand. It is also possible that a user individually sets these curves. In this example, curves prepared in the image processing apparatus are used.

Figure 22:
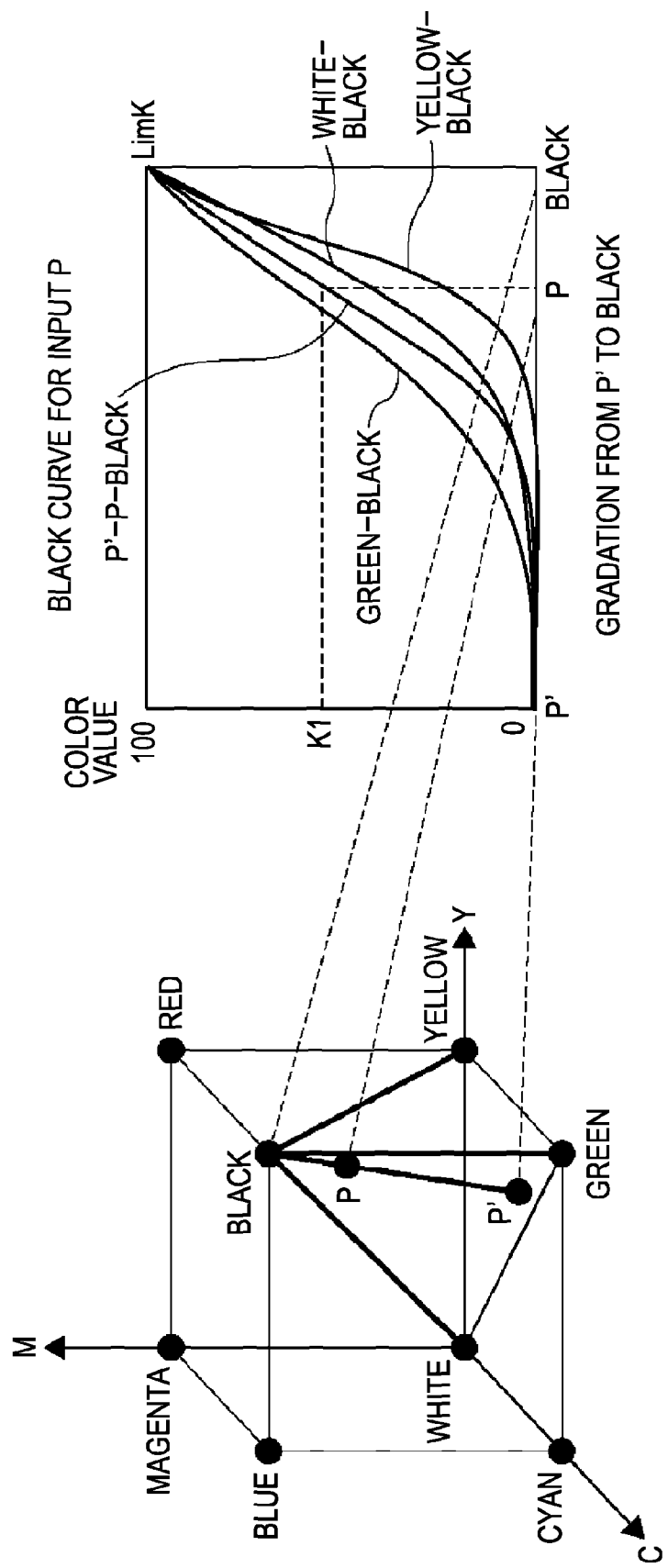
FIG. 22 illustrates black generation curves obtained by interpolation and set with respect to the gradation in FIG. 11.

In the processing of Step S205, among these seven black generation curves, three black generation curves relating to the tetrahedron to which the point P belongs are used, and a black generation curve of gradations (P'-P-Black) is generated by interpolation processing. In the example of FIG. 11, since the point P is contained in the tetrahedron having the vertices of White-Green-Yellow-Black, the black generation curve of gradations can be obtained by interpolating the three black generation curves of White-Black, Green-Black, and Yellow-Black, as illustrated in FIG. 22.

Figure 23:
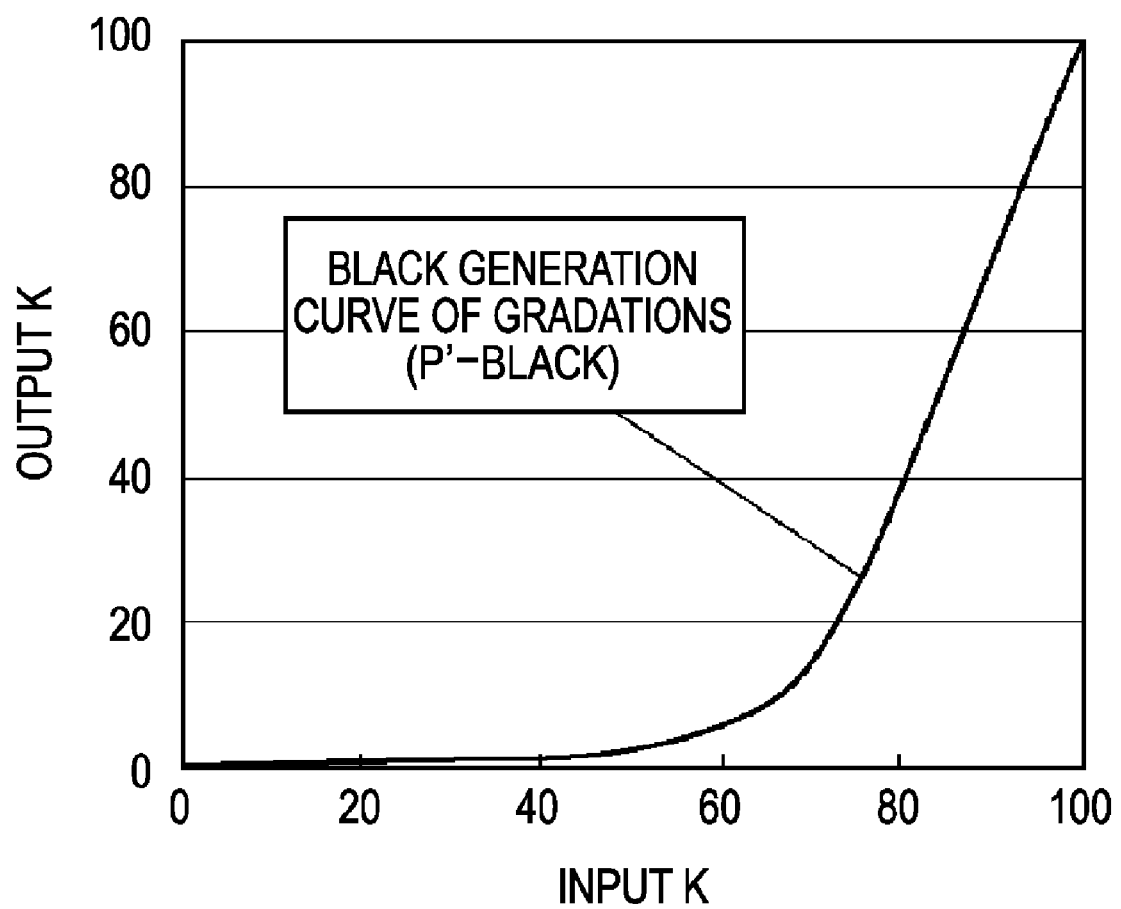
FIG. 23 illustrates a black generation curve obtained by interpolation.

Subsequently, the output K value (final value after conversion) is determined (Step S203). The output K value is obtained on the basis of the black generation curve of gradations (see, FIG. 23) obtained in the above processing of Step S205. Specifically, the output K value (K1) at the point P is an output value obtained when ((distance from P' to P)/(distance from P' to Black))×100 is input of the black generation function represented by the black generation curve illustrated in FIG. 23. Then, the individual output CMY values are extracted in accordance with a ratio to the corresponding input CMY values (Step S204).

Figure 24:
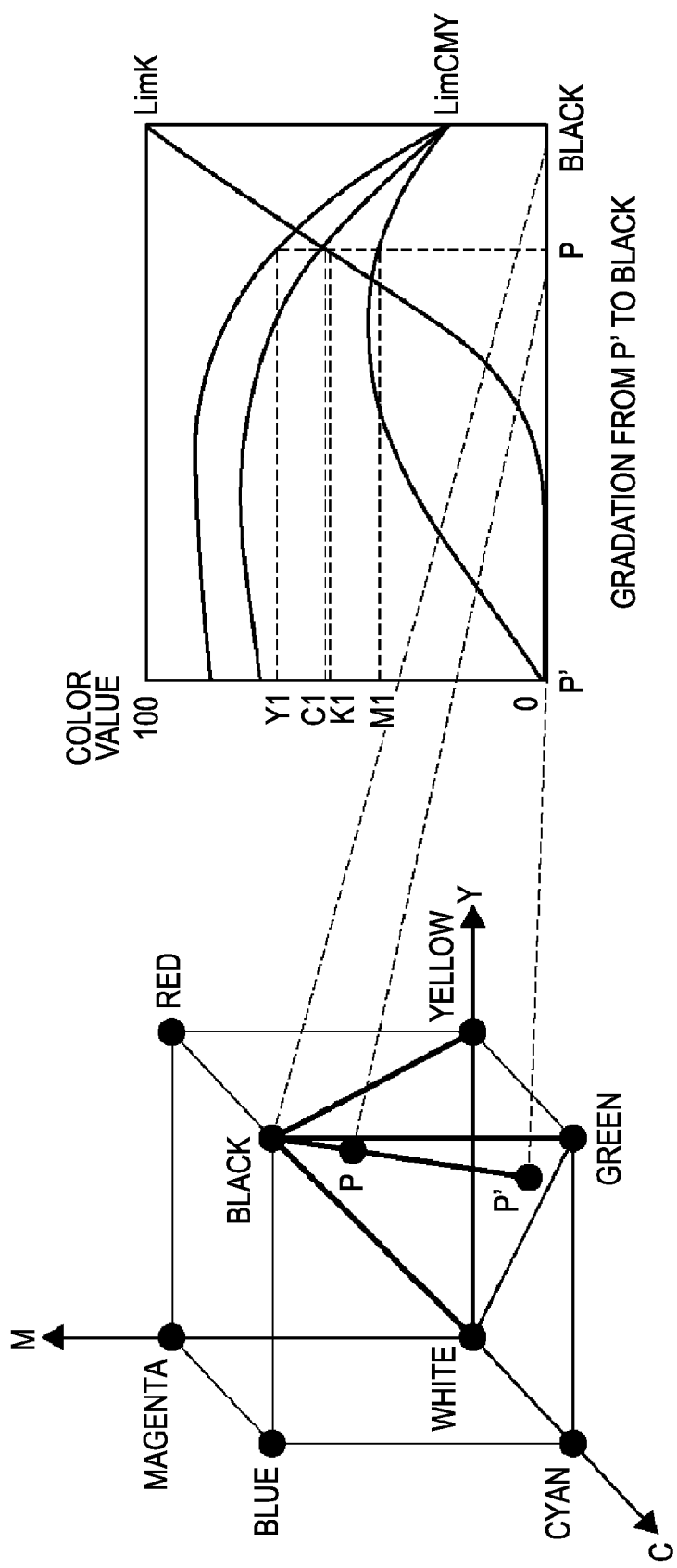
FIG. 24 illustrates an example of a case where the individual CMY values are defined with respect to the gradation in FIG. 22.

FIG. 24 illustrates an example of a result of color separation with gradation after each of the output CMY values is extracted. Thus, in the third example of color separation, color separation is performed while gradations are taken into account, and thus the output CMYK values C1, M1, Y1, and K1 are obtained.

In FIGS. 21 to 24, the entire gradations are illustrated for ease of description. However, it is not necessary to calculate the entire gradations, and only gradations corresponding to the input point P should be calculated.

(Another Example of Black Generation Curve Setting)

In the above examples of setting of black generation curves, only the black generation curve of a gray line is specified by a user, and the black generation curves corresponding to the primary colors are appropriately prepared by the image processing apparatus. However, a black generation curve of the primary colors may also be specified by the user.

For example, a user interface illustrated in FIG. 25 may be provided. This user interface is different from that of FIG. 3 in that a detailed setting button 1010 is provided in the black generation curve setting field 1008. When the user is not skilled in this technical field, only the black generation curve of gray line can be specified by the user, and preset black generation curves of primary colors can be used. When the user is well versed in this technical field, the user can switch objects (curves) to be set using the detailed setting button 1010, and individually customizing the black generation curves of primary colors.

FIG. 26 is an example of a black generation curve setting window for primary colors (black generation curve for primary-color setting window 1100). This window 1100 includes a color setting field 1101, a black generation curve setting field 1102, and a black generation curve 1103. In the color setting field 1101, a user selects a color corresponding to a black generation curve to be customized using radio buttons. In the black generation curve setting field 1102, the black generation curve of the color selected in the color setting field 1101 is displayed for customizing. Each of the black generation curves can be adjusted by the same scheme as employed for the black generation curve 1009 in the user interface illustrated in FIG. 3.

With the procedure described above, the user can select a degree of customization of the black generation curves. The black generation curves set through the above procedure (gray line and six primary colors) are set in the initial setting of Step S100 in FIG. 8.

(Automatic Correction of Black Generation Curve)

In the following, automatic correction of a black generation curve of a primary color (herein after also referred to as a black generation curve for primary color) will be described.

The image processing apparatus prepares a black generation curve of a gray line serving as a reference (hereinafter referred to as a gray-line reference curve), and a black generation curve for primary color serving as a reference corresponding to the gray line reference curve (hereinafter referred to as a primary-color reference curve). The user sets the black generation curve 1009 in the black generation curve setting field 1008 in the user interface of FIG. 3. This black generation curve for gray line specified by the user and the gray line reference curve are compared. Then, the difference between the user specified black generation curve for gray line and the gray-line reference curve is reflected on the primary-color reference curve for correction, and a black generation curve for primary color is automatically created on the basis of the correction.

Figure 27:
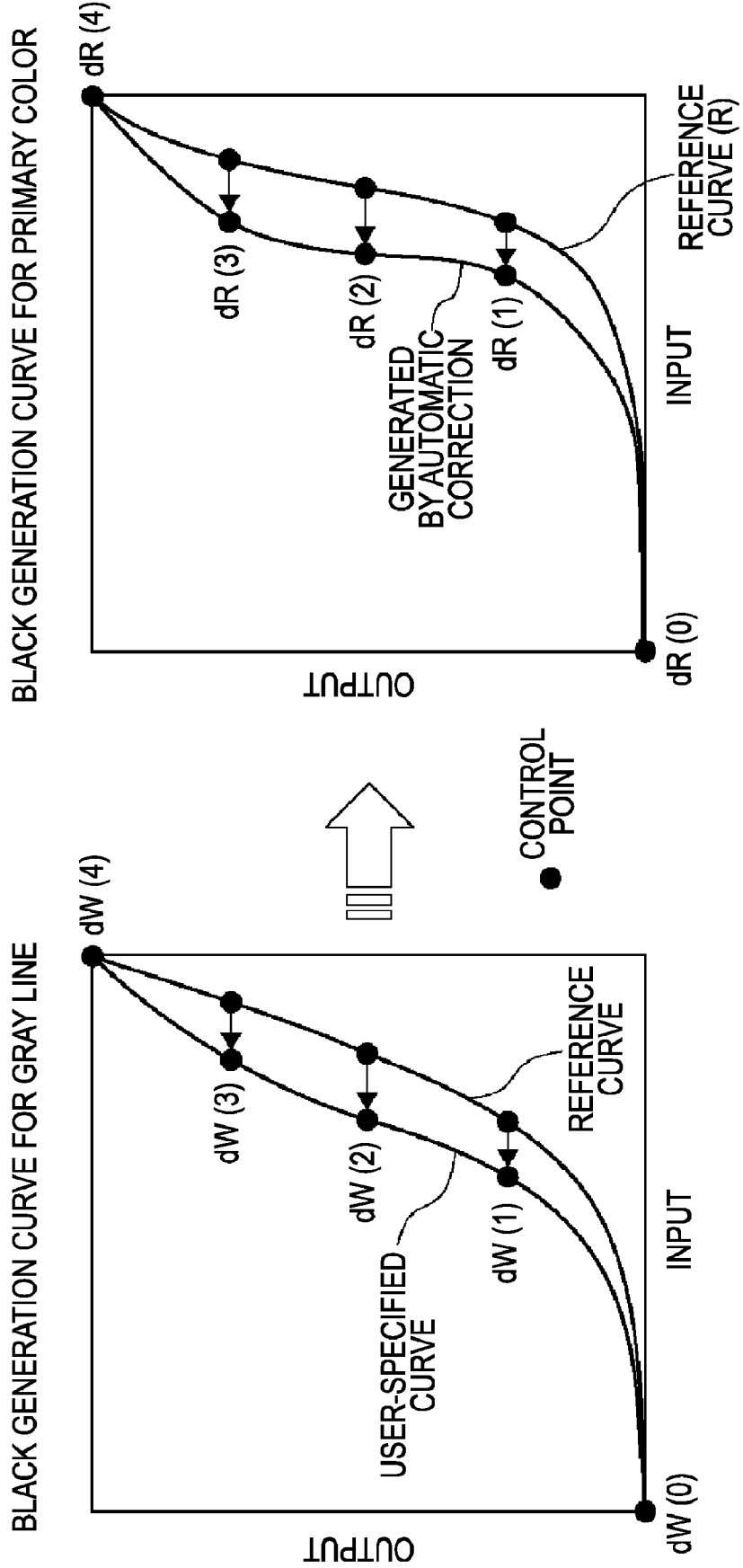
FIG. 27 illustrates a process in which a black generation curve for primary colors is created from a black generation reference curve for primary colors, on the basis of a difference between a black generation reference curve for gray line and a black generation curve specified by a user.

Referring to FIG. 27, the automatic correction of a black generation curve for primary color will be illustrated using an example of a black generation curve of Red. For example, a black generation curve to be specified by the user through the user interface of FIG. 3 is generated by setting several control points and then performing spline interpolation or the like (FIGS. 3, 25, and 26 illustrate 5-point spline). A difference between the curve specified by the user and the gray-line reference curve with respect to each of the control points (dW(0) to dW(4)) is obtained. These differences (dW(0) to dW(4)) are used for correction of the primary-color reference curve. For example, a correction amount dR(n) is set as $$dR(n)=dW(n)\times\alpha,$$

where n represents a control point number and a represents a correction parameter. When α is 1, dR(n)=dW(n) is satisfied, and thus the black generation curve of Red can be corrected by an amount equal to the difference between the user-specified curve and the gray-line reference curve. Likewise, the other black generation curves for primary color are corrected.

As described above, black generation curves for primary color can be generated by correcting a primary reference curve in accordance with an arbitrary black generation curve specified by the user. In addition, the user does not need to consider the black generation curves for primary color during the above processing, which simplifies user operation.

While the examples of the color separation are individually described above, color separation realized by the combination of all or some of the above examples may have increased effectiveness.

[Example of Saturation-Increase Conversion]

(First Example of Saturation-Increase Conversion)

Figure 28:
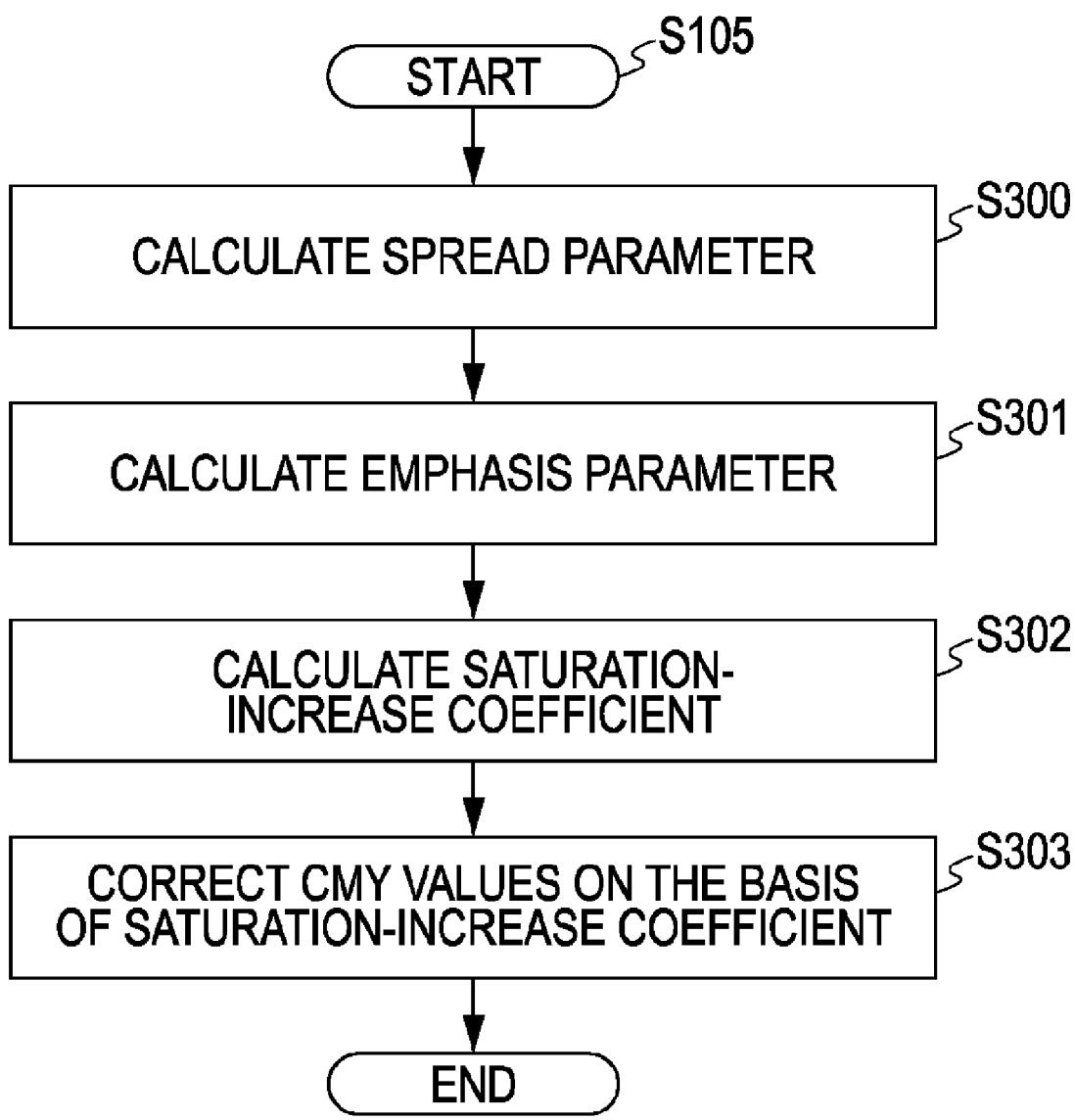
FIG. 28 is a flowchart illustrating an example of saturation-increase conversion.

FIG. 28 is a flowchart illustrating a first example of a processing procedure of the saturation-increase conversion (Step S105) mentioned above.

The CMYK values obtained through the color separation with gradations (Step S104) indicate that the amount of a black colorant is significantly increased while chromatic components composed of CMY are decreased in a shadow portion close to Black. Therefore, the balance between chromatic colors and achromatic colors is disrupted, which causes a significant decrease in saturation. As a result, the color reproduction range in the shadow portion is decreased, and thus the gradation reproducibility in the shadow portion is deteriorated. This is particularly true when a high degree of restriction is imposed on the amount of colorant. Thus, the saturation-increase conversion in this example is performed with a view to preventing a decrease in a color reproduction range and deterioration of gradation reproducibility in a shadow portion in an image by suppressing a decrease in chromatic components in the shadow portion.

In the saturation-increase conversion, a spread parameter sp, which is a reference value, is first calculated at Step S300. The spread parameter sp is defined on the basis of an output K value (K1) as $$sp=(K1/100)\times(1-K1/100).$$

Figure 29:
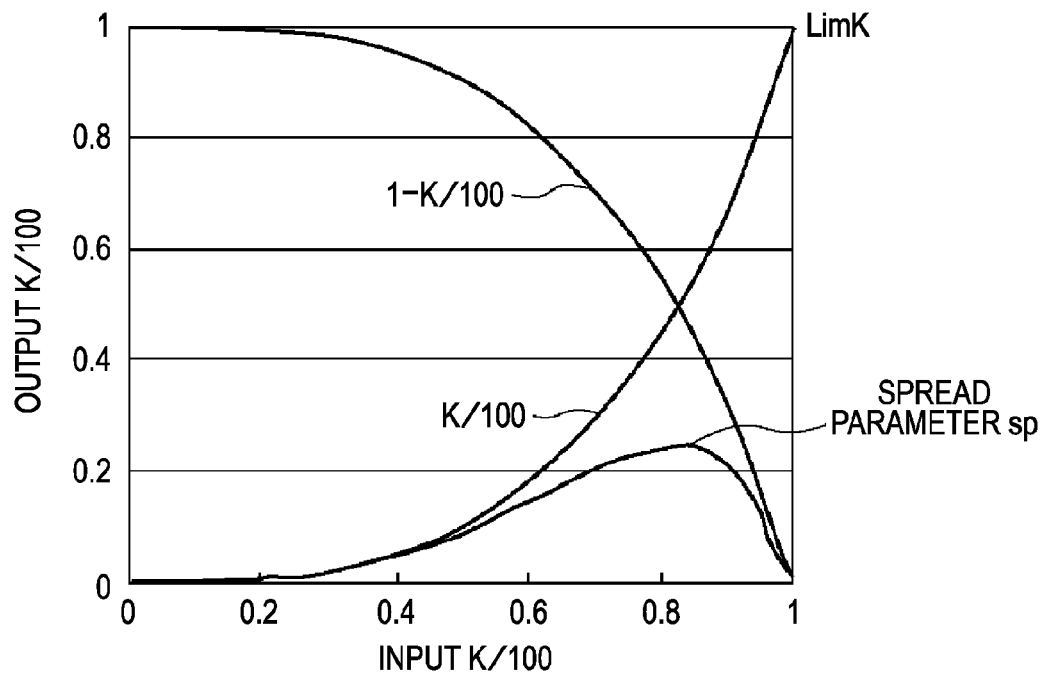
FIG. 29 illustrates a spread parameter sp.

FIG. 29 is a graph for comparison between a black generation curve (K) and the spread parameter. As can be seen from the graph, the spread parameter is 0 when K is 0 as well as when K is LimK (100), and is maximized when K is equal to LimK/2 (50). By defining the reference parameter using the amount of a black colorant, a portion at which the saturation is decreased due to the black amount can be specifically observed.

Then, at Step S301, an emphasis parameter em is calculated. The emphasis parameter em is set such that the colorant amount of the color of the smallest colorant among C, M, and Y at the point P' becomes 0 after saturation-increase conversion using the emphasis parameter em, at a point where K is LimK/2 (i.e., sp is maximized).

Figure 30:
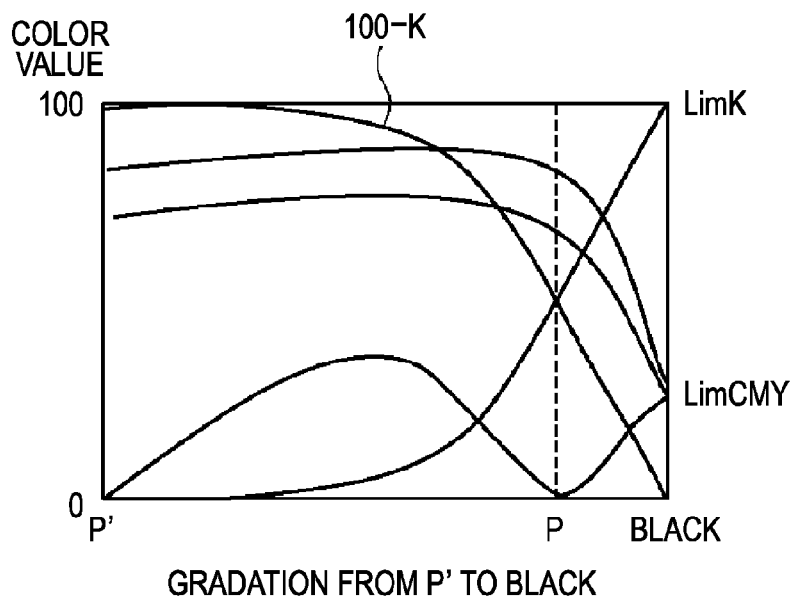
FIG. 30 illustrates examples of results of color separation with gradations obtained before and after saturation-increase conversion using a spread parameter and an emphasis parameter.

As can be seen from the examples of FIGS. 13 and 24, the color of the smallest colorant among CMY at the point P' is Magenta. Thus, when the M value to be obtained after the saturation-increase conversion is 0 at the point where K value is 50 (i.e., LimK/2), the corresponding emphasis parameter em is obtained by inverse calculation as illustrated in FIG. 30. When K value is 50 (LimK/2), sp is 0.25, and a specific calculation scheme is shown below (where the M colorant amount is the smallest):

$$M(K=LimK/2)+(Min(C', M', Y')-LimCMY)\times(sp\times em)=0$$

$$em=-M(K=LimK/2)/((Min(C', M', Y')-LimCMY)\times 0.25),$$

where $M(K=LimK/2)$ is the value of Magenta at a point where K=Lim/2.

Subsequently, at Step S302, a saturation-increase coefficient Cup at the point P is calculated on the basis of the above parameters. The saturation-increase coefficient Cup can be obtained by multiplying the spread parameter sp by the emphasis parameter em, as $$Cup = sp \times em.$$

Then, at Step S303, the output CMY values (C1, M1, Y1) are corrected on the basis of the saturation-increase coefficient Cup, and thus corrected CMYK values (C2, M2, Y2, K1) are obtained as $$C2 = C1 + (C' - \text{Lim}CMY) \times \text{Cup}$$

$$M2 = M1 + (M' - \text{Lim}CMY) \times \text{Cup}$$

$$Y2 = Y1 + (Y' - \text{Lim}CMY) \times \text{Cup}.$$

Figure 31:
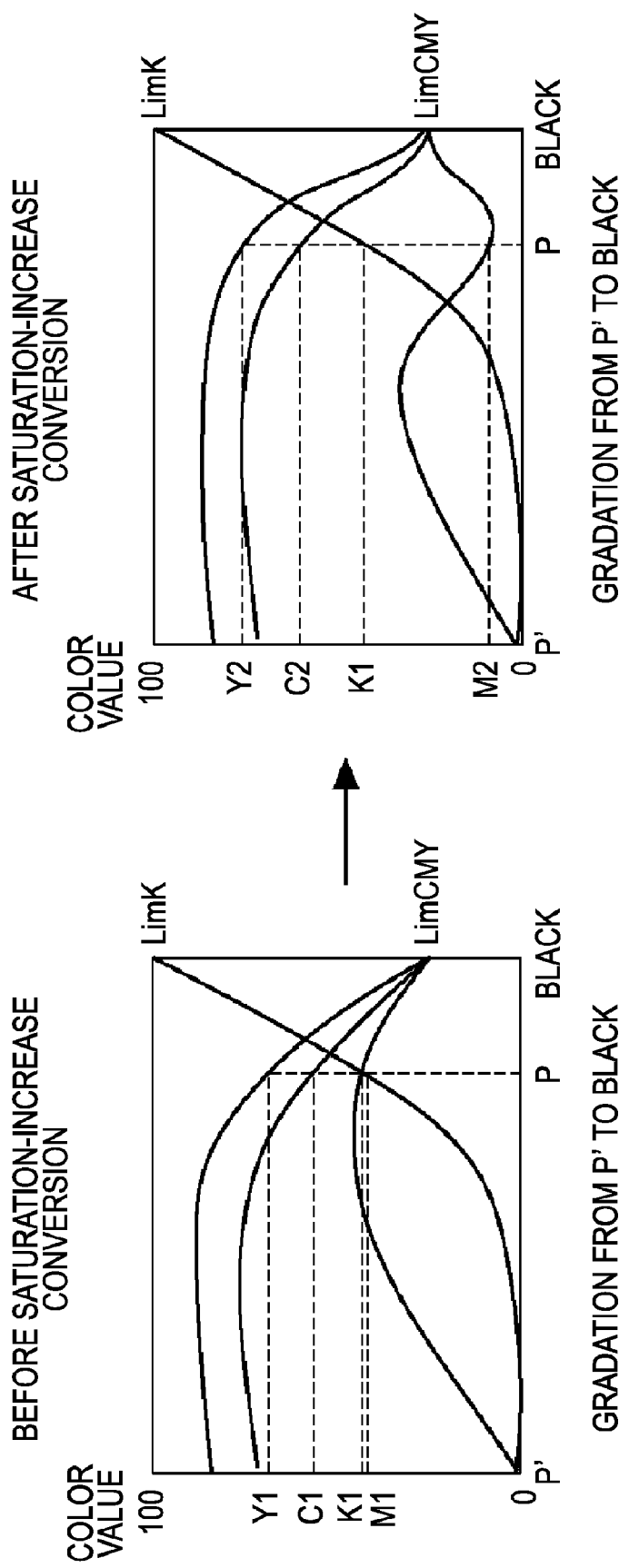
FIG. 31 illustrates examples of results of color separation with gradation obtained before and after saturation-increase conversion of the first example.

FIG. 31 illustrates results of color separation with gradations with and without saturation-increase conversion. As can be seen from the figure, after the saturation-increase conversion, a difference between the values of Y and M is increased in the shadow portion near the point Black. This indicates that the chromatic components are increased, while the achromatic components are decreased.

Figure 32:
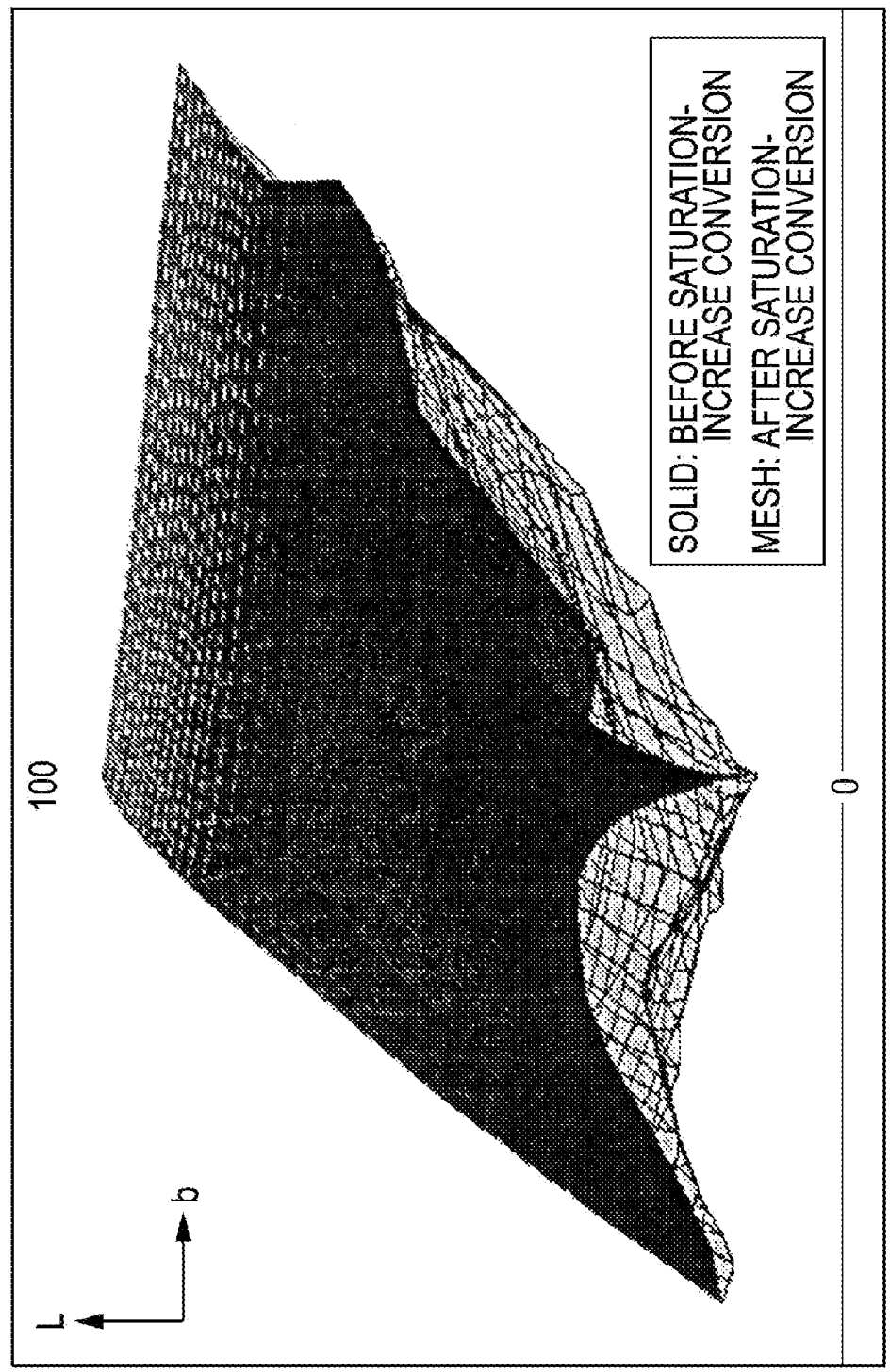
FIG. 32 illustrates an example of a difference in a color reproduction range before and after saturation-increase conversion of the first example.

FIG. 32 illustrates a difference in the color reproduction range before and after the saturation-increase conversion. As can be seen from the figure, the color reproduction range in the shadow portion is significantly increased as a result of saturation-increase conversion. The CMYK values (C2, M2, Y2, and K1) are thus obtained through the procedure of the saturation-increase conversion described above. In FIGS. 29 to 31, the entire gradations are illustrated for ease of description. However, it is not necessary to calculate the entire gradations, and only gradations corresponding to the point P should be calculated.

(Second Example of Saturation-Increase Conversion)

In the following, a second example of saturation-increase conversion will be described. Simple saturation-increase conversion using the spread parameter and the emphasis parameter as in the first example produces a large difference between the individual values of CMY at a point near the point Black, while they are equal at the point Black. This causes deterioration of a gray balance at a point near the point Black. In view of this, the gray balance can be improved by adjusting the individual values of CMY to be as close to each other as possible.

Figure 33:
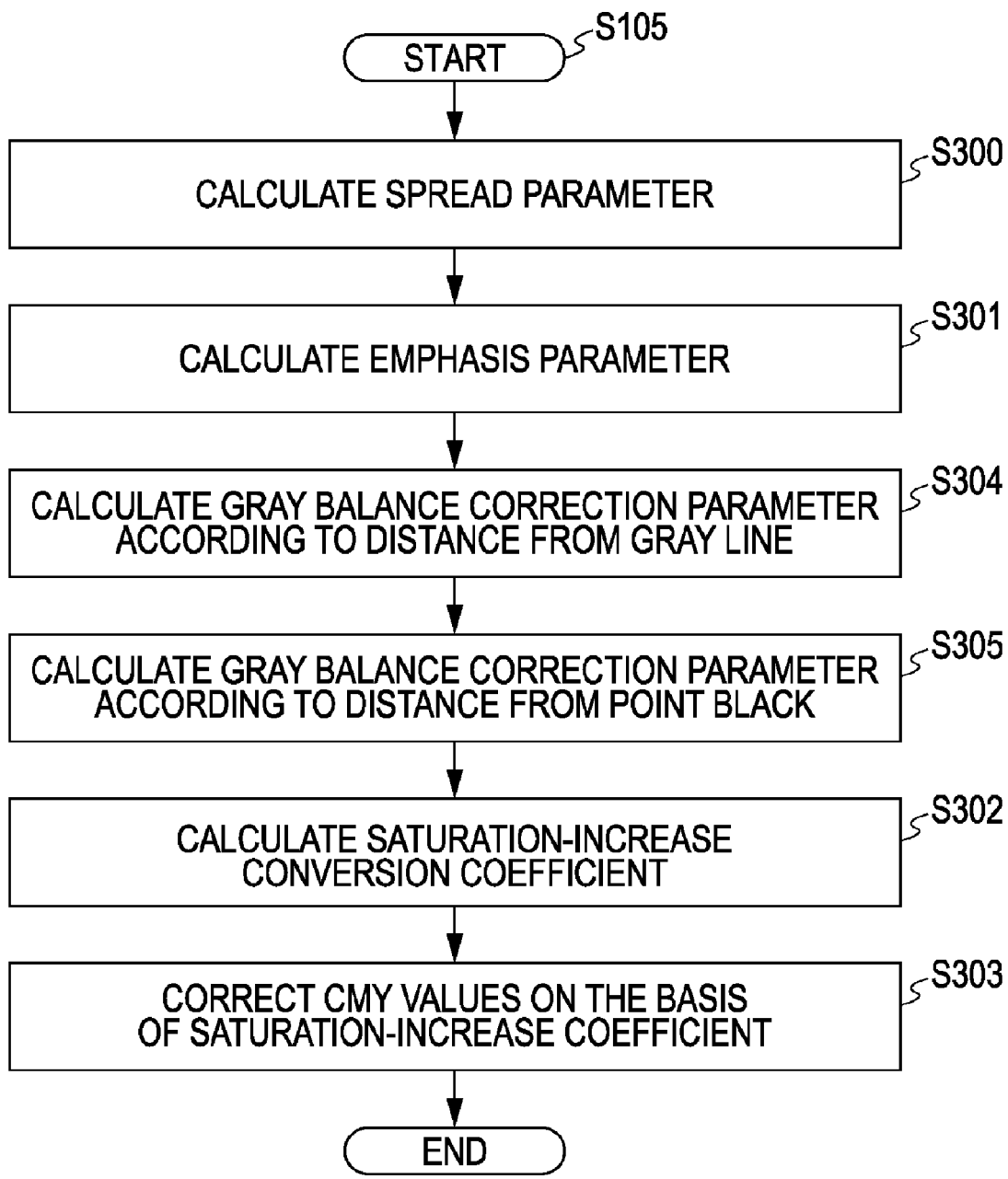
FIG. 33 is flowchart illustrating a processing procedure of saturation-increase conversion of a second example.

FIG. 33 is a flowchart illustrating a processing procedure of the second example of the saturation-increase conversion (Step S105). In this flowchart, similar processing steps as those in the first example (FIG. 28) are designated by the same reference numerals and the detailed description thereof will not be repeated.

Similarly to the first example, a spread parameter sp is calculated (Step S300), and an emphasis parameter is calculated (Step S301).

Figure 34:
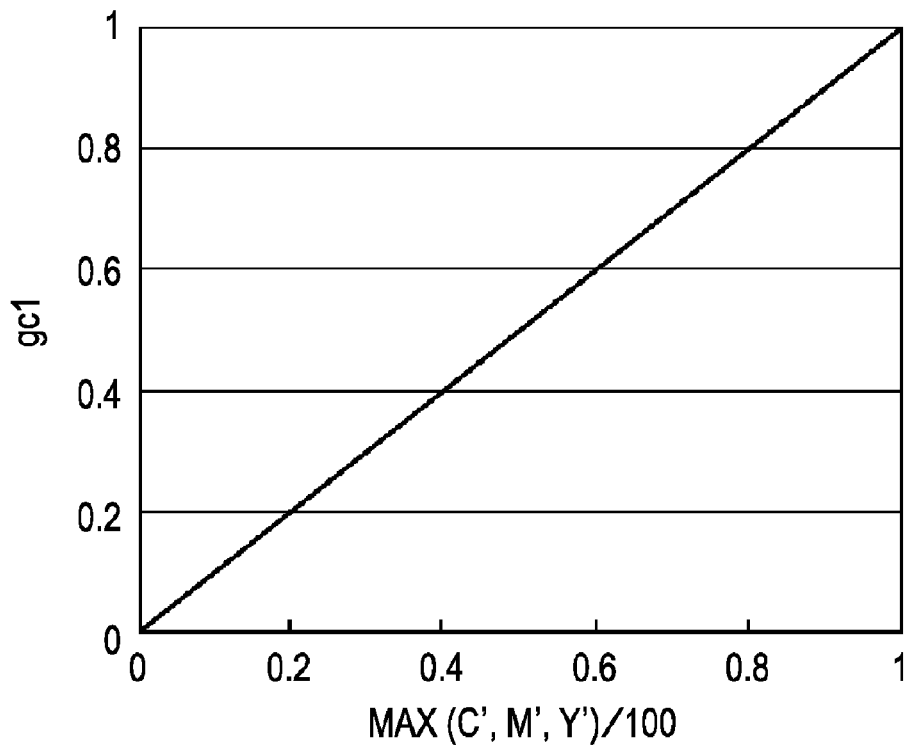
FIG. 34 is a profile of a gray balance correction parameter gc1 versus a distance with respect to a gray line.

Then, at Step S304, a gray balance correction parameter gc1, which is based on a distance from the point P' to a gray line, is calculated. The gray line is a line connecting the point White and the point Black in FIG. 10, where the values of CMY are equal. The effectiveness of saturation-increase conversion increases as the point P' becomes closer to any of the primary colors (Red, Green, Blue, Cyan, Magenta, Yellow), i.e., the maximum value Max(C', M', Y) at the point P' increases. On the other hand, the effectiveness of saturation-increase conversion decreases as the point P' becomes closer to the gray line, and becomes zero on the gray line (Max(C', M', Y)=0). Thus, the saturation-increase conversion can be performed taking into account the gray balance. As illustrated in FIG. 34, the gray balance correction parameter gc1 is set in accordance with a distance between the point P' and the gray line using the following equation.

$$gc1 = \text{Max}(C', M', Y)/100$$

By multiplying gc1 by the saturation-increase coefficient Cup, adjustment which takes into account the effectiveness of saturation-increase conversion described above can be realized.

Figure 35:
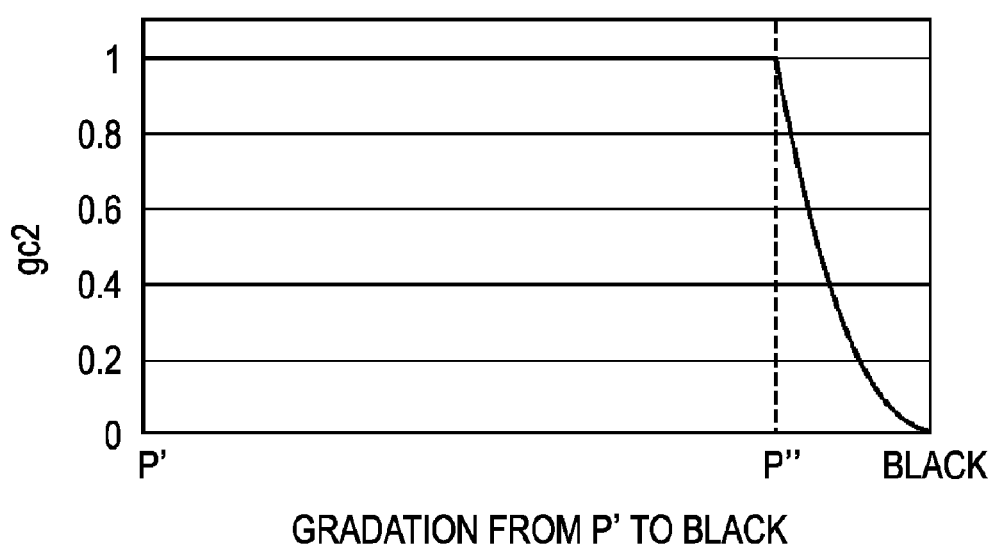
FIG. 35 is a profile of a gray balance correction parameter gc2 versus a distance with respect to the point Black.

Subsequently, at Step S305, a gray balance correction parameter gc2, which is based on a distance from a point P' to the point Black is calculated. At the point Black in the color solid of FIG. 10, the values of CMY need to be equal in view of a desirable gray balance for a black color. In addition, it is desirable that the values of CMY become closer to each other as the point becomes closer to the point Black. However, as can be seen from FIG. 30, with the simple saturation-increase conversion using only the spread parameter and the emphasis parameter, the individual values of CMY are largely different in the vicinity of the point Black, while they are equal at the point Black. As a result, the gray balance of a color close to Black is deteriorated. Thus, the gray balance can be improved by adjusting the values of CMY to be as close as possible in the vicinity of the point Black. This can be realized by the following equations, which is illustrated in FIG. 35.

$$gc2 = (d(P)/(d(P') \times p\_\text{thre}))^2 \quad 0 \leq d(P)/d(P') < p\_\text{thre}$$

$$gc2 = 1.0 \quad p\_\text{thre} \leq d(P)/d(P')$$

In the above equations, d(P) represents a distance between the point P and the point Black, d(P') represents a distance from the point P' to the point Black, and P_thre indicates a range of correction with respect to the point Black. For example, as shown in FIG. 35, the range of correction is from the point Black to the point P'''' (p_thre=1/11). As indicated in the above equation, gc2 is decreased as a quadratic function. However, another function such as a cosine function may be used. Subsequently, the saturation-increase coefficient Cup at the point P is calculated on the basis of the above parameters (Step S302). The saturation-increase coefficient is obtained by multiplying the spread parameter sp by the emphasis parameter em, the gray balance parameter gc1, and the gray balance parameter gc2, as $$\text{Cup} = sp \times em \times gc1 \times gc2.$$

FIG. 36 illustrates results of saturation-increase conversion with and without gray balance correction. As can be seen from the figure, the gradients of the individual curves from the point P to the point Black decrease by the effect of the gray balance correction parameter gc1, and the amount of CMY colorants are corrected so as to be close to each other by the effect of the gray balance correction parameter gc2.

Then, the CMY values (C1, M1, and Y1) are corrected on the basis of the saturation-increase coefficient Cup, and thus the corrected output CMYK values (C2, M2, Y2, K1) is obtained (Step S303).

Figure 37:
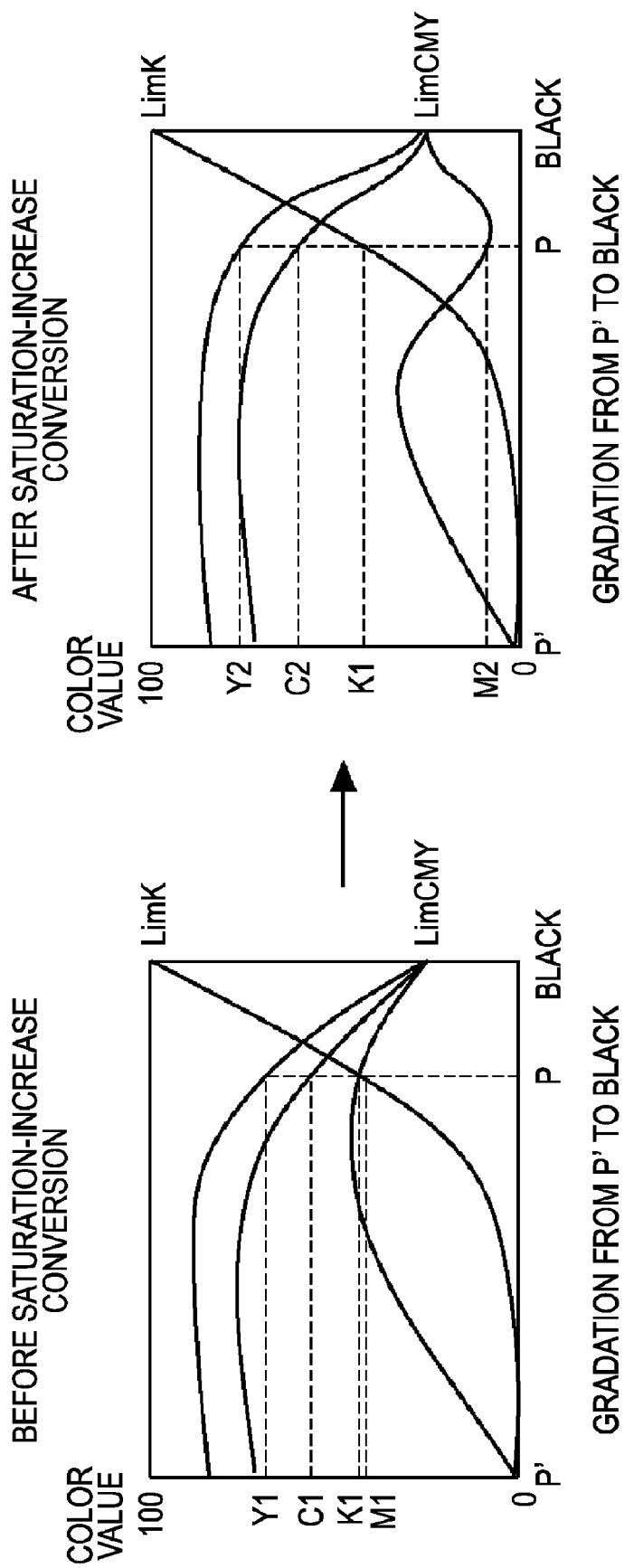
FIG. 37 illustrates examples of results of color separation with gradations obtained before and after saturation-increase conversion of the second example.

FIG. 37 illustrates examples of results of color separations obtained before and after the saturation-increase conversion. As a result of the saturation-increase conversion the difference between Y and M is increased in a shadow portion near the point Black, indicating that the chromatic components are increased while the achromatic components are decreased. In addition, the color reproduction range in the shadow portion is significantly increased as a result of the saturation-increase conversion.

Through the above procedure, saturation-increase conversion is performed, and the CMYK values C2, M2, Y2, and K1 are obtained. In FIGS. 35 to 37, the entire gradations are illustrated for ease of description. However, it is not necessary to calculate the entire gradations, and gradations corresponding to the point P should be calculated.

(Third Example of Saturation-Increase Conversion)

In the following, a third example of saturation-increase conversion will be illustrated. In this example, a colorant amount parameter is used in addition to the spread parameter sp and the emphasis parameter em.

Figure 38:
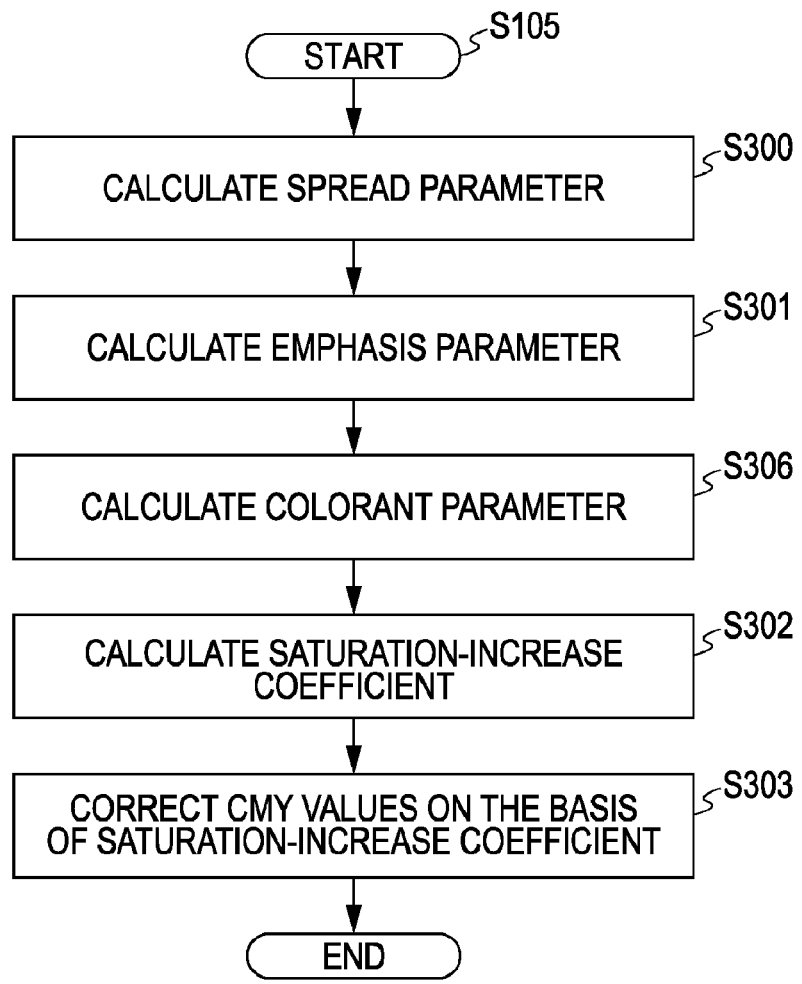
FIG. 38 is a flowchart illustrating a processing procedure of saturation-increase conversion of a third example.

FIG. 38 is a flowchart illustrating a processing procedure of saturation-increase conversion (Step S105). In the flowchart, similar processing steps to those in the first example (FIG. 28) are designated by the same reference numerals, and thus the detailed description thereof will not be repeated.

First, a spread parameter sp and an emphasis parameter are calculated (Step S300), (Step S301).

Figure 39:
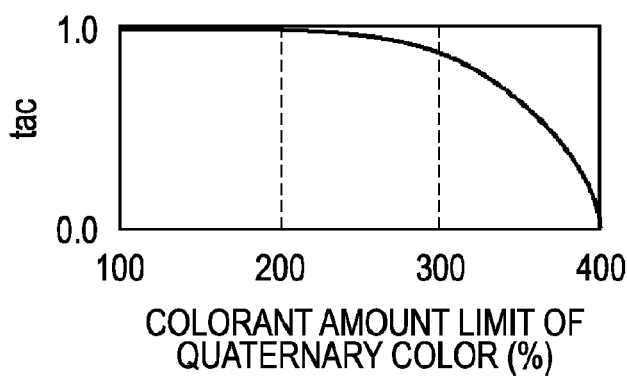
FIG. 39 illustrates a colorant amount parameter tac.

Then, at Step S306, a colorant parameter tac is calculated. Saturation-increase conversion is highly effective when a high degree of restriction is imposed on a colorant amount. However, when a sufficient amount of colorant can be used, desirable color reproducibility can be achieved with the output CMYK values (Step S104) without saturation-increase conversion. Thus, the colorant amount parameter is adjusted so that the effect of saturation-increase conversion is decreased as a colorant amount limit increases, i.e., the limit becomes closer to 400%, (tac=0, where Lim4=400%). For example, as indicated in FIG. 39, the colorant amount parameter tac is set in accordance with the colorant amount limit, as $$tac=1-((Lim4/100-2)/4)^2 \ Lim4>200$$

tac=1 otherwise.

Then, the saturation-increase coefficient Cup at the point P is calculated on the basis of the above parameters (Step S302). In this case, the saturation-increase coefficient Cup is obtained by multiplying the spread parameter sp by the emphasis parameter em and the colorant amount parameter tac, as $$Cup=sp \times em \times tac.$$

Then, the CMY values (C1, M1, and Y1) are corrected on the basis of the saturation-increase coefficient Cup, and thus the corrected output CMYK values (C2, M2, Y2, K1) are obtained (Step S303).

Figure 40:
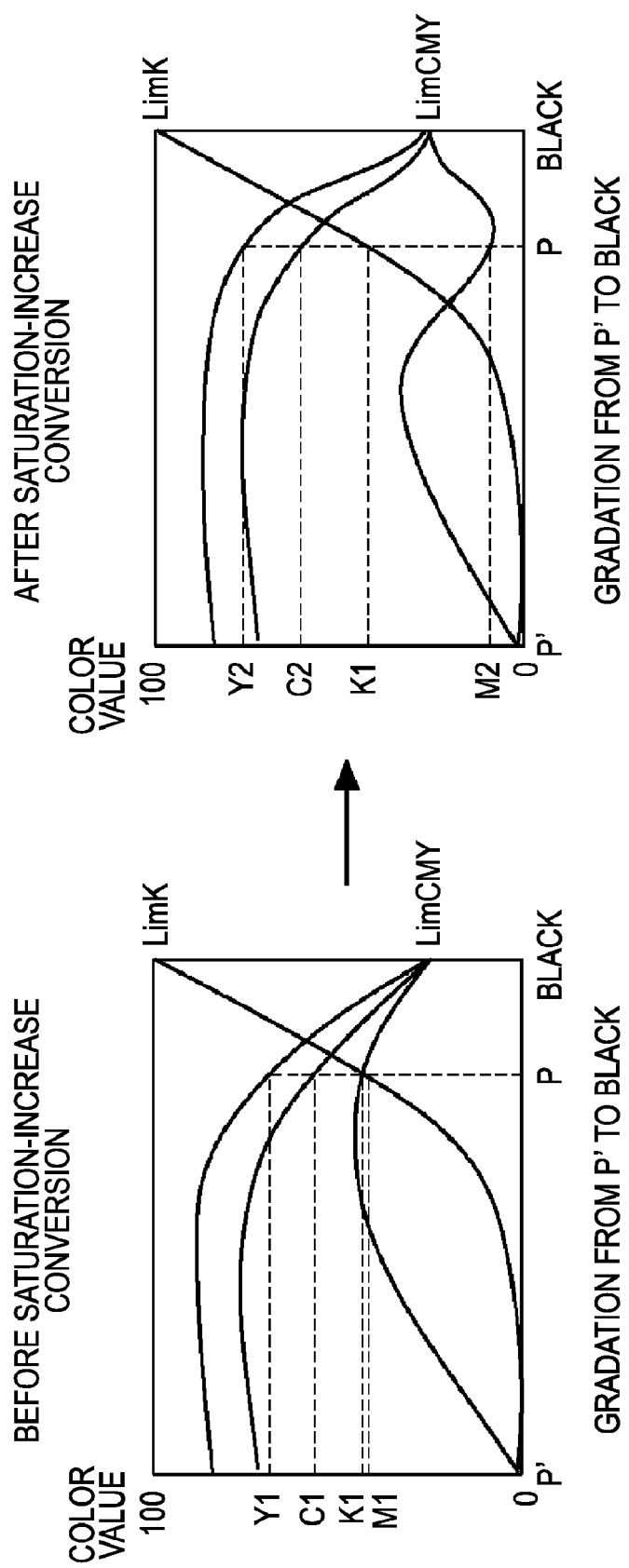
FIG. 40 illustrates examples of results of color separation with gradations obtained before and after saturation-increase conversion of the third example.
Figure 41:
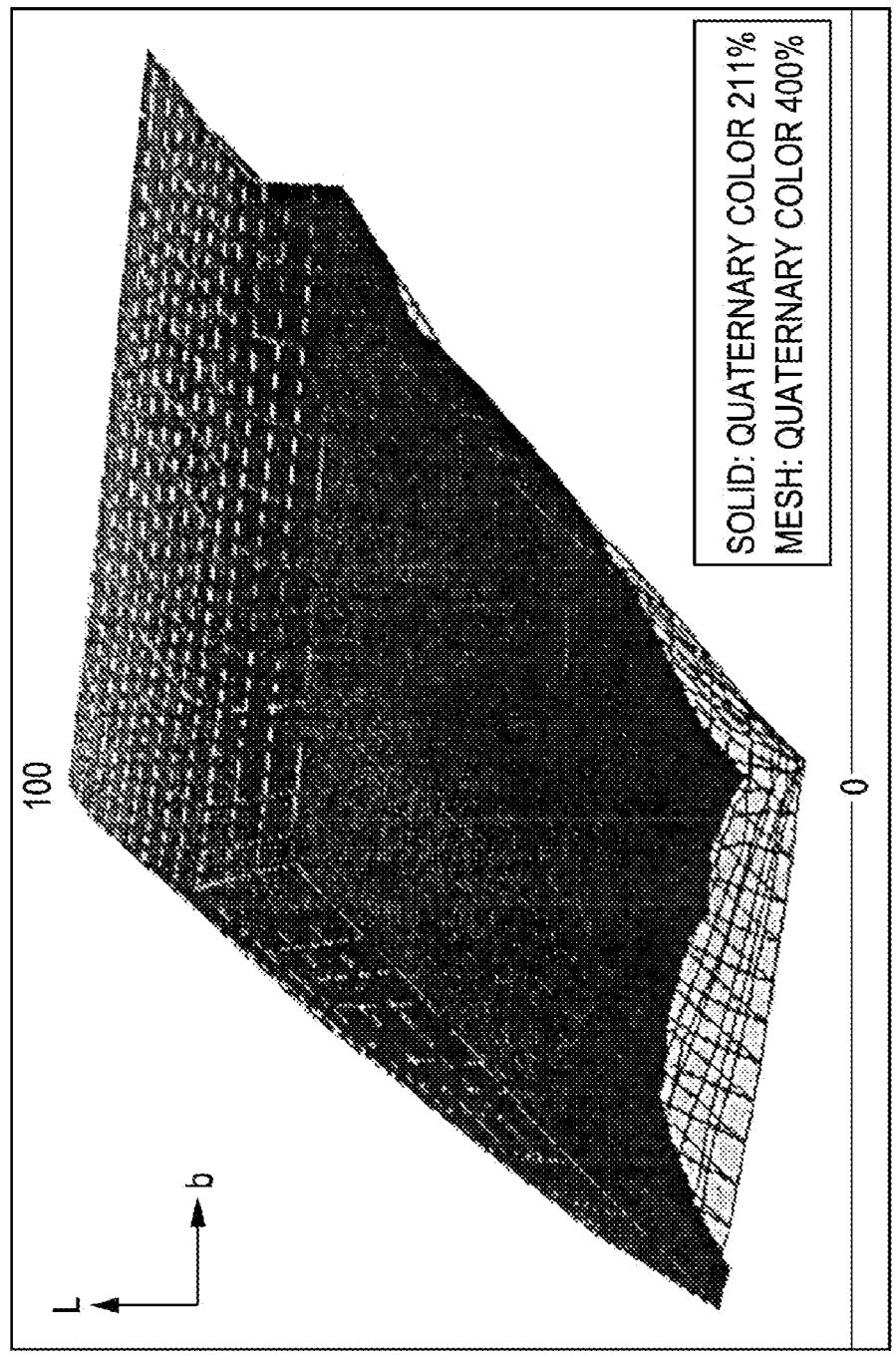
FIG. 41 illustrates a difference in a color reproduction range due to a colorant amount limit.

FIG. 40 illustrates examples of result of color separation with gradations obtained before and after saturation-increase conversion. It can be seen that the difference between Y and M is increased in a shadow portion near Black as a result of the saturation-increase conversion, indicating that the chromatic components are increased while the achromatic components are decreased in the shadow portion. The figure also indicates that the color reproduction range in the shadow portion is significantly increased as a result of the saturation-increase conversion.

Through the above procedure, saturation-increase conversion is performed, and the CMYK values C2, M2, Y2, and K1 are obtained. In FIGS. 39 to 40, the entire gradations are illustrated for ease of description. However, it is not necessary to calculate the entire gradations, and gradations corresponding to the point P should be calculated.

While the examples of the color separation are individually described above, color separation which can be realized by the combination of all or some of the examples may have increased effectiveness. Such a combination is also included in the exemplary embodiments of the present invention.

As described above, when color reproduction is performed for a shadow portion when the amount of available colorants is strictly limited, a color reproduction range in terms of saturation is decreased since a large amount of chromatic components are replaced by black components. As a result, gradation reproducibility is deteriorated since a range of expression of color change is decreased, as in the case of the related art. On the other hand, according to the above exemplary embodiments, the balance between the amounts of individual chromatic colorants of CMY is changed while the amount of a black colorant remains constant. As a result, chromatic components are increased while achromatic components are decreased in a portion in an image. This arrangement maintains the color reproduction range as much as possible and realizes increase in both saturation reproducibility and gradation reproducibility.

By performing the device RGB to CMYK conversion using the technique described above, an accurate color conversion table can be created through a general process in which only calorimetric data is used and parameters such as density characteristics of a printer are not used, even when the amount of available colorants is strictly limited.

In the above exemplary embodiments, device-RGB to CMYK conversion is performed by a general process in which parameters such as density characteristics of a printer are not used. However, such parameters can also be used when available. In this case, density correction processing using density characteristics data may be performed instead of the saturation-increase conversion in the device-RGB to CMYK converting unit.

In addition, a device-independent color space applied in the above exemplary embodiments is not limited to Lab, and other device-independent color spaces such as Luv and XYZ may also be applied.

The present invention may be applied to a system which includes a plurality of apparatuses as well as to a device which includes one apparatus.

The present invention also encompasses arrangements wherein program code for realizing the functions of the above-described embodiments are supplied to a system or an apparatus having a computer (CPU or MPU) capable of reading and executing the supplied program codes.

In this case, program code read from the storage medium realizes the functions of the above-described embodiments. That is, the storage medium storing the program code may be encompassed in the present invention.

Examples of the recording media for supplying the program include magnetic recording media such as floppy disks, hard disks, optical disks, magneto-optical disks (MO), compact disk-read-only memory (CD-ROM), CD-recordable (CD-R), CD-rewriteable (CD-RW). For recording media, magnetic tapes, non-volatile memory cards, read-only memory (ROM), digital versatile disk-ROM (DVD-ROM), DVD-R, and so forth can be employed.

In addition to the functions of the above-described embodiment being realized by the program code read out being executed on a computer, the functions of the above-described embodiment may be realized by the Operating System running on the computer performing part or all of the actual processing based on instructions of the program code.

Moreover, the functions described above may be realized by the program code read out from the storage medium being written to memory provided to a function expansion board inserted into the computer or a function expansion unit connected to the computer, and the CPU of the function expansion board or function expansion unit performs part or all of actual processing based on the instructions of the program.

As described above, different black generation processing is performed on an arbitrary printer in accordance with the hue of a color, without using information such as output density characteristics specific to the color printer. With this arrangement, differences between characteristics of individual color printers can be compensated for. As a result, creation of accurate color conversion tables that produce desirable color reproduction is realized. In addition, color conversion processing which maintains a color reproduction range as much as possible and prevents deterioration of gradation reproducibility can be realized even in the case where a high degree of restriction is imposed on the amount of colorants.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-296940 filed on Oct. 31, 2006, which is hereby incorporated by reference herein in its entirety.

What is claimed is:

1. A color processing method for creating a conversion table for converting a color in a device-independent color space into a color in a device-dependent color space, using a colorimetry result of a color patch output by a device, comprising:
inputting black generation curves of a gray line and lines which connect primary colors and a black point of the device-independent color space, the black generation curves being set individually by a user;
using a processor to perform the steps of:
converting an input color in a three-dimensional device-independent color space into color components data of a four-dimensional device-dependent color space using the input black generation curves; and
performing a correction for the converted color components data so that a saturation of the converted color components data becomes higher in accordance with an amount of black component data of the converted color components data.

2. The image processing method of claim 1,
wherein the black generation curves of primary colors are selected through a user interface from among those automatically generated and those individually set by the user.

3. The image processing method of claim 1,
wherein the black generation curves of primary colors are automatically generated based on the black generation curve of a gray line.

4. The image processing method of claim 1,
wherein the converting is performed using a limit of the amount of a colorant, the limit being specified through a user interface.

5. The image processing method of claim 1,
wherein the converting includes calculating a sum of the amounts of colorants corresponding to output color components data, and performing color separation so that the sum of the colorant amounts do not exceed a colorant amount limit.

6. The image processing method of claim 5,
wherein the converting converts the individual color components data in the four-dimensional device color space except black component data while maintaining a color separation curve corresponding to the black component data.

7. The image processing method of claim 1,
wherein the performing includes a correction of the values of the color components data in the four-dimensional device color space except the value of the black component data.

8. The image processing method of claim 1,
wherein the performing includes calculating a spread parameter representing a level of decrease in the intensity of chromatic colors based on a result of the converting, calculating an emphasis parameter for emphasizing saturation in a portion of an image where the intensity of chromatic colors decreases, and calculating a saturation-increase coefficient based on the spread parameter and the emphasis parameter.

9. A computer-readable storage medium storing a computer program for causing a computer to execute the color processing method of claim 1.

10. An information processing apparatus for creating a conversion table for converting a color in a device-independent color space into a color in a device-dependent color space, using a colorimetry result of a color patch, comprising:
an input unit configured to input black generation curves of a gray line and lines which connect primary colors and a black point of the device-independent color space, the black generation curves being set individually by a user;
a conversion unit configured to convert an input color in a three-dimensional device-independent color space into color components data of a four-dimensional device-dependent color space using the input black generation curves; and
a correction unit configured to perform a correction for the converted color components data so that a saturation of the converted color components data becomes higher in accordance with an amount of black component data of the converted color components data.

* * * * *